United States Patent
Ross, Jr. et al.

(10) Patent No.: US 7,621,565 B2
(45) Date of Patent: Nov. 24, 2009

(54) CONTAINER MOUNTING ASSEMBLY

(75) Inventors: Herbert G. Ross, Jr., Argyle, TX (US); Danny E. Swindler, Prosper, TX (US)

(73) Assignee: Component Concepts International, LLC, Lancaster, VA (US)

( * ) Notice: Subject to any disclaimer, the term of this patent is extended or adjusted under 35 U.S.C. 154(b) by 430 days.

(21) Appl. No.: 11/464,234

(22) Filed: Aug. 14, 2006

(65) Prior Publication Data

US 2008/0042028 A1 Feb. 21, 2008

(51) Int. Cl.
*B60P 3/22* (2006.01)

(52) U.S. Cl. .................... 280/830; 280/834; 280/838; 248/240; 248/346.01

(58) Field of Classification Search ............. 248/133, 248/136, 138, 139, 166, 311.2, 346.3, 154, 248/310, 346.06, 346.01, 286.1, 291.1
See application file for complete search history.

(56) References Cited

U.S. PATENT DOCUMENTS

| | | | |
|---|---|---|---|
| 4,025,080 A | 5/1977 | Gedeon | |
| 4,059,281 A | 11/1977 | Evans | |
| 4,770,428 A | 9/1988 | Sugiyama | |
| 4,843,978 A * | 7/1989 | Schmidt et al. | 108/138 |
| 4,941,718 A * | 7/1990 | Alexander et al. | 312/312 |
| 5,302,015 A * | 4/1994 | Du Vall | 312/282 |
| 5,328,320 A * | 7/1994 | Farrow et al. | 414/495 |
| 5,329,865 A * | 7/1994 | McWard | 109/50 |
| 5,634,665 A * | 6/1997 | Jung | 280/834 |
| 5,806,892 A | 9/1998 | Colburn | |
| 5,845,940 A * | 12/1998 | Colburn | 280/830 |
| 6,098,693 A * | 8/2000 | Frey, Jr. | 160/67 |
| 6,256,078 B1 * | 7/2001 | Ogata | 349/58 |
| 6,316,847 B1 * | 11/2001 | Crockett | 307/125 |
| 6,488,069 B1 * | 12/2002 | Mashaw et al. | 160/67 |
| 6,523,796 B2 * | 2/2003 | Abramowsky et al. | 248/284.1 |
| 6,637,706 B2 * | 10/2003 | Kim et al. | 248/154 |
| 7,134,829 B2 * | 11/2006 | Quenzi et al. | 414/482 |
| 7,249,786 B2 * | 7/2007 | Mascarenhas et al. | 280/830 |
| 2005/0146165 A1 * | 7/2005 | Tai | 297/68 |
| 2006/0273631 A1 * | 12/2006 | White et al. | 297/85 |
| 2008/0000159 A1 * | 1/2008 | Gilbert | 49/345 |
| 2008/0000164 A1 * | 1/2008 | Erickson et al. | 49/394 |
| 2008/0042028 A1 * | 2/2008 | Ross et al. | 248/230.1 |

* cited by examiner

*Primary Examiner*—J. Allen Shriver, II
*Assistant Examiner*—Alaeddin Mohseni
(74) *Attorney, Agent, or Firm*—Alvin R. Wirthlin

(57) ABSTRACT

A mounting assembly for holding and moving a propane cylinder between a first operational position and a second lower loading/unloading position with respect to a support structure of a forklift is provided. The mounting assembly includes a base member adapted for connection to the forklift support structure, a cradle for supporting the cylinder between the first and second positions, and first and second pivot arms having a first end pivotally connected to the base member and a second end pivotally connected to the cradle. In the first position, the cradle is in a generally horizontal orientation. In the second position, the cradle is in a generally vertical orientation. Angular movement of the first and second pivot arms causes rotation of the cradle between the generally horizontal and generally vertical orientations.

20 Claims, 14 Drawing Sheets

CONTAINER MOUNTING ASSEMBLY

BACKGROUND OF THE INVENTION

The invention relates generally to a mounting assembly for installing/removing a container associated with a mobile vehicle or stationary equipment, and more particularly to a mounting assembly for installing/removing a liquid propane tank associated with a forklift or the like.

Conventional forklifts typically include a vehicle frame, a mast attached to the front end of the vehicle frame, a fork carriage adapted for elevational movement along the mast to raise and lower loads, and a counterweight located at the rear end of the vehicle frame for retaining balance of the forklift as heavyweight loads are lifted up and lowered down. An engine is typically mounted at the center of the vehicle frame and usually is covered with a hood. A driver's seat is typically fixedly secured to the hood and surrounded by an overhead guard which defines a cabin. Many such forklifts are powered by liquid propane and therefore include a liquid propane tank that is removably mounted on a support structure of the counterweight. In order to prevent forklift down time, the propane tank is often replaced before it is completely empty. Since some tanks do not have a fuel gauge, a significant amount of cost can be incurred since useful amounts of propane may be left in the tank upon replacement. Even if a fuel gauge is provided, the dial indicator is not readily viewable by an operator.

The procedure for replacing the propane tank can be a difficult and potentially dangerous task, as the operator must lower the empty fuel tank at a height of about four feet or more to the ground and must lift a full tank from ground to the same height. Empty liquid propane tanks normally weight between about 20 and 50 lbs, while full tanks weigh between about 40 and 90 lbs. With the fuel tank held at chest level or higher, the operator must extend the tank over the counterweight to connect the tank to the support structure. In addition, raising the tank from a vertical position to the installed horizontal position and vice-versa requires twisting action by the operator as well as carefully maneuvering an alignment aperture in the tank with an alignment pin associated with the forklift under heavy loads. The consequential strain on the operator may lead to the risk of injury.

BRIEF SUMMARY OF THE PREFERRED EMBODIMENTS

According to one embodiment of the invention, a mounting assembly for holding and moving a container between a first operational position and a second lower loading/unloading position with respect to a support structure is provided. The mounting assembly includes a base member adapted for connection to the support structure, a cradle for supporting the container between the first and second positions, and first and second pivot arms. Each pivot arm has a first end pivotally connected to the base member and a second end pivotally connected to the cradle. With this arrangement, movement of the cradle between the first and second positions causes angular movement of the first and second pivot arms, with the second end of the second pivot arm being lower than the first end of the second pivot arm when the cradle is in the second position.

According to a further embodiment of the invention, a mounting assembly for holding and moving a propane cylinder between a first operational position and a second lower loading/unloading position with respect to a support structure of a forklift is provided. The mounting assembly includes a base member adapted for connection to the forklift support structure, a cradle for supporting the cylinder between the first and second positions, and first and second pivot arms having a first end pivotally connected to the base member and a second end pivotally connected to the cradle. In the first position, the cradle is in a generally horizontal orientation. In the second position, the cradle is in a generally vertical orientation. Angular movement of the first and second pivot arms causes rotation of the cradle between the generally horizontal and generally vertical orientations.

BRIEF DESCRIPTION OF THE DRAWINGS

The foregoing summary as well as the following detailed description of the preferred embodiments will be best understood when considered in conjunction with the accompanying drawings, wherein like designations denote like elements throughout the drawings, and wherein.

It is noted that the drawings are intended to depict typical or exemplary embodiments and therefore should not be considered as limiting the scope thereof. It is further noted that the drawings are not necessarily to scale. The preferred embodiments will now be described in greater detail with reference to the accompanying drawings.

DETAILED DESCRIPTION OF THE PREFERRED EMBODIMENTS

Figure 1:
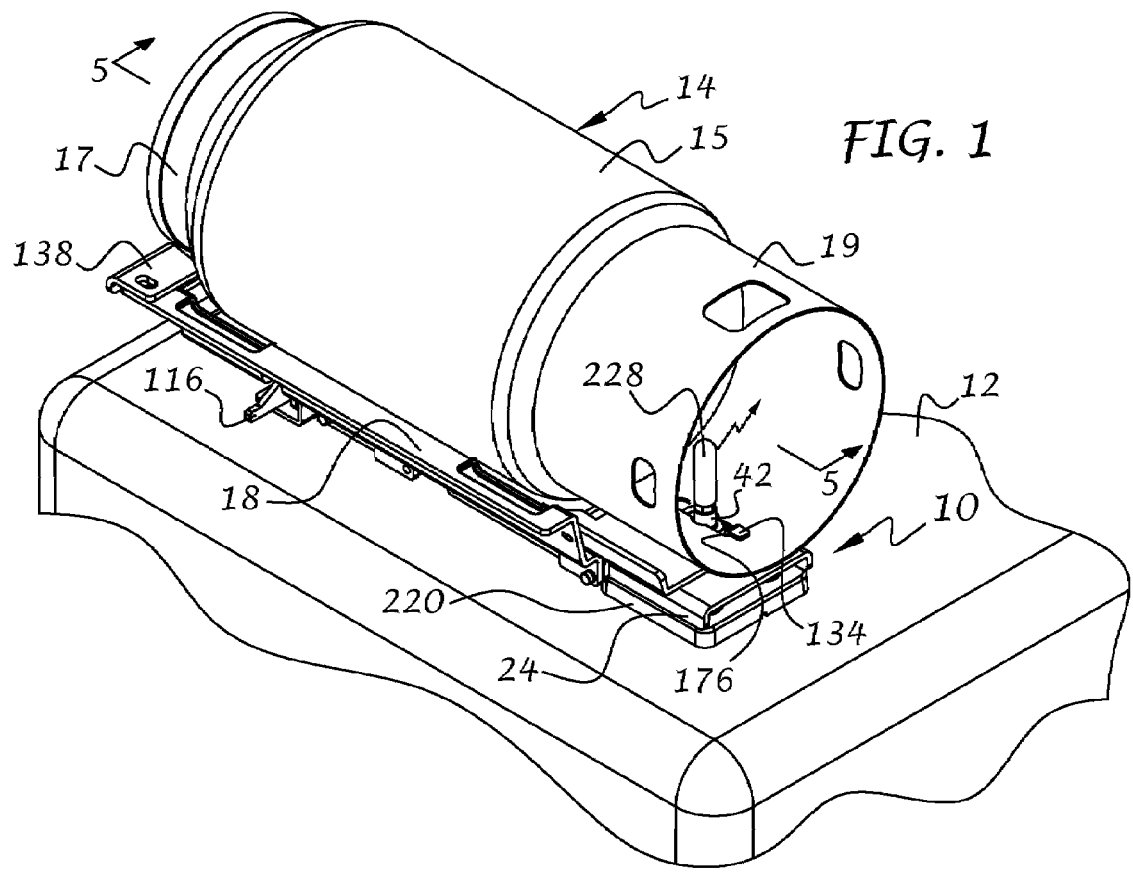
FIG. 1 is a right front perspective view of a container coupled to a mounting assembly which is in turn connected to supporting structure of a vehicle or stationary equipment in accordance with a preferred embodiment of the invention.
Figure 2:
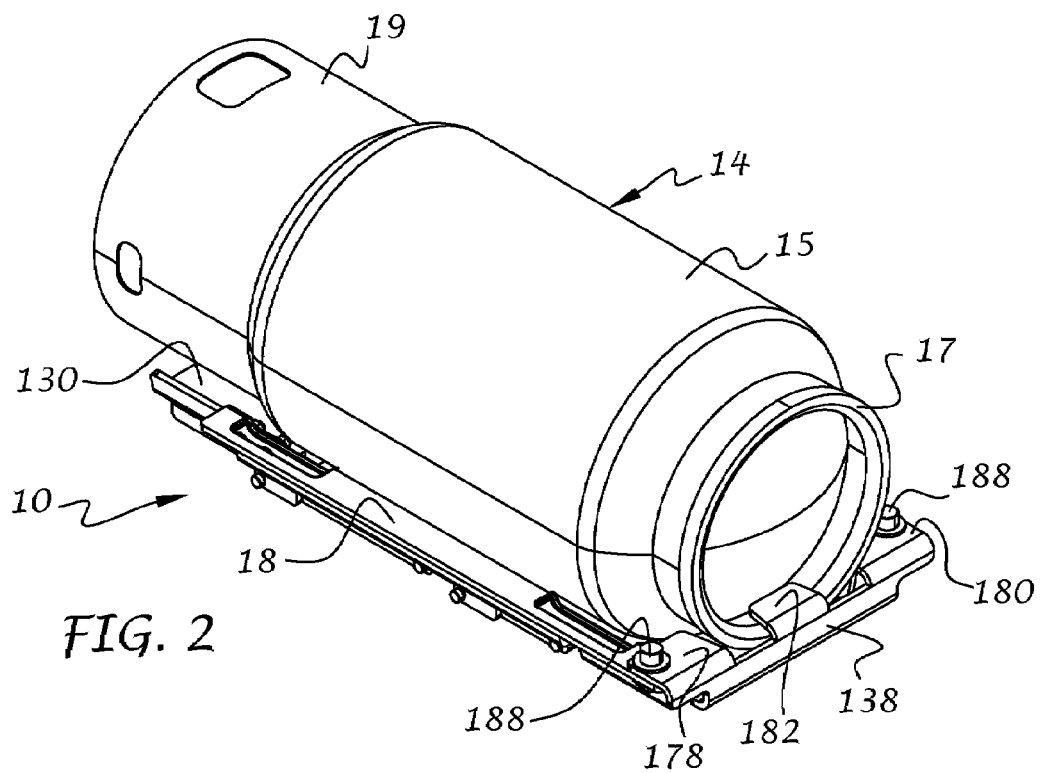
FIG. 2 is a left rear perspective view of the container and mounting assembly.

Referring now to the drawings, and to FIG. 1 in particular, a mounting assembly 10 in accordance with a preferred embodiment of the invention is connected to support structure 12 of a vehicle or stationary equipment. The mounting assembly 10 is preferably adapted for releasably holding a container 14 so that the container may be held in an operational position (FIG. 1) with respect to the support structure 12 and moved to a lower loading/unloading position (FIG. 15) and back again, as will be described in greater detail below. In accordance with one adaptation of the preferred embodiment, the support structure 12 represents a portion of a forklift while the container 14 represents a propane or LP gas cylinder removably connected to the forklift via the mounting assembly 10. As will be appreciated, the preferred embodiments are not limited to propane tanks and forklifts, but may apply to other vehicles or stationary equipment and other containers or storage devices. By way of example, the mounting assembly 10 may be readily adapted for attachment to the roof of a vehicle (the support structure) and the container may be in the form of a luggage carrier that can be stored in an operational position during vehicle travel and lowered to a loading/unloading position for luggage and/or other items to be transported or removed.

Figure 5:
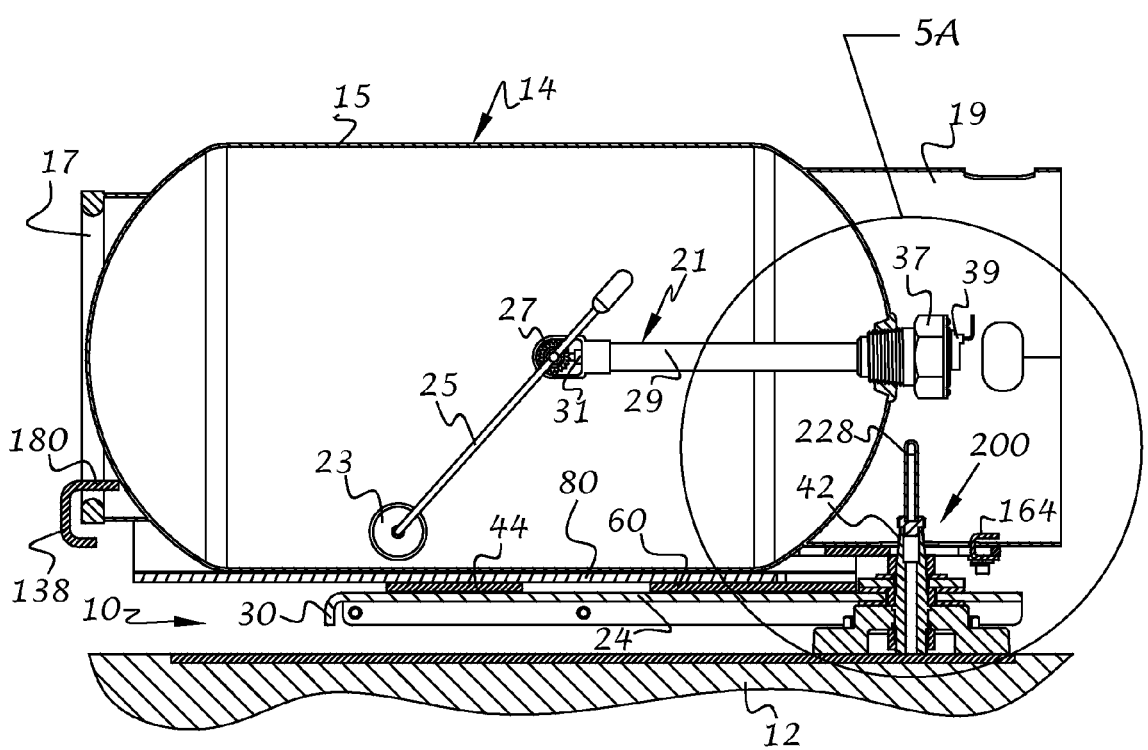
FIG. 5 is a sectional view of the fuel tank and mounting assembly taken along line 5-5 of FIG. 1.

As shown in FIG. 5, when the mounting assembly 10 is utilized for accessing a container 14 in the form of a propane cylinder or the like, the container is preferably of conventional construction and may include a pressure cylinder 15 for holding a quantity of propane, an annular base 17 located at one end of the cylinder 15 for holding the cylinder in an upright position during storage, an annular wall 19 located at the opposite end of the cylinder 15, and a fuel gauge 21 mounted to and extending through the cylinder wall in a well-known manner. Preferably, the fuel gauge 21 has a float 23 connected to a pivot arm 25 which is in turn connected to a gear 27 rotatably mounted on a hollow support tube 29 of the fuel gauge 21. A spur gear 31 meshes with the gear 27 and causes rotation of a shaft (not shown) extending through the support tube 29. The shaft in turn rotates a magnet (not shown) within a mounting head 37 of the fuel gauge 21. A dial pointer with a magnetic hub (not shown) attached to the mounting head 37 is magnetically driven by the rotating magnet to thereby indicate liquid level. In addition, a magnetic pick-up device 39, preferably in the form of a magnetic flux field sensor, detects the rotational position of the magnetic hub for creating an electric signal indicative of liquid level within the cylinder 15. A more detailed description of the fuel gauge 21 can be found in U.S. Pat. No. 6,564,632 issued to Herbert G. Ross on May 20, 2003, the disclosure of which is hereby incorporated by reference. Although not shown, it will be understood that the container 14 may include other components typically associated with a propane cylinder, such as a fill/supply valve, over-pressure safety valve, and so on.

With reference to FIGS. 2-5, the mounting assembly 10 preferably includes a base member 16 for connection to the support structure 12, a cradle 18, a first pivot arm 20 and second pivot arm 22 that are rotatably connected to the base member 16 and the cradle 18. Preferably, the second pivot arm 22 is shorter than the first pivot arm 20 and both pivot arms are strategically positioned at predefined pivot points or axes on the base member 16 and cradle 18 so that the cradle moves along a predefined pathway with respect to the base member, as will be described in greater detail below.

The base member 16 preferably includes an elongate plate 24, a pair of first flanges or bars 26 and 28 that extend downwardly from opposite sides of the plate 24, and a downwardly projecting rear flange portion 30. The bars 26, 28 include a pair of aligned forward apertures 32, 33 and a pair of aligned rear apertures 34, 35 that define forward and rear pivot points and thus forward and rear axes 36 and 38, respectively. A hole 40 is formed at a forward end of the plate 24 for receiving a pintle 42 (FIGS. 1, 5 and 5A) of a pivot assembly for pivotally connecting the mounting assembly 10 to the support structure 12. Preferably, the plate 24 and depending bars 26, 28 and apertures are formed by stamping and bending a single sheet of metallic material. However, it will be understood that the base member can be constructed of different materials, such as plastics, composites, and/or any other suitable material. It will be further understood that the base member 16 can be formed by cutting, machining, extrusion, molding, or any other well known forming means. In addition, although the plate and bars are shown as a unitary structure, they may be formed separately and attached together using well-known attaching techniques such as welding, adhesive bonding, fastening, and so on.

Figure 8:
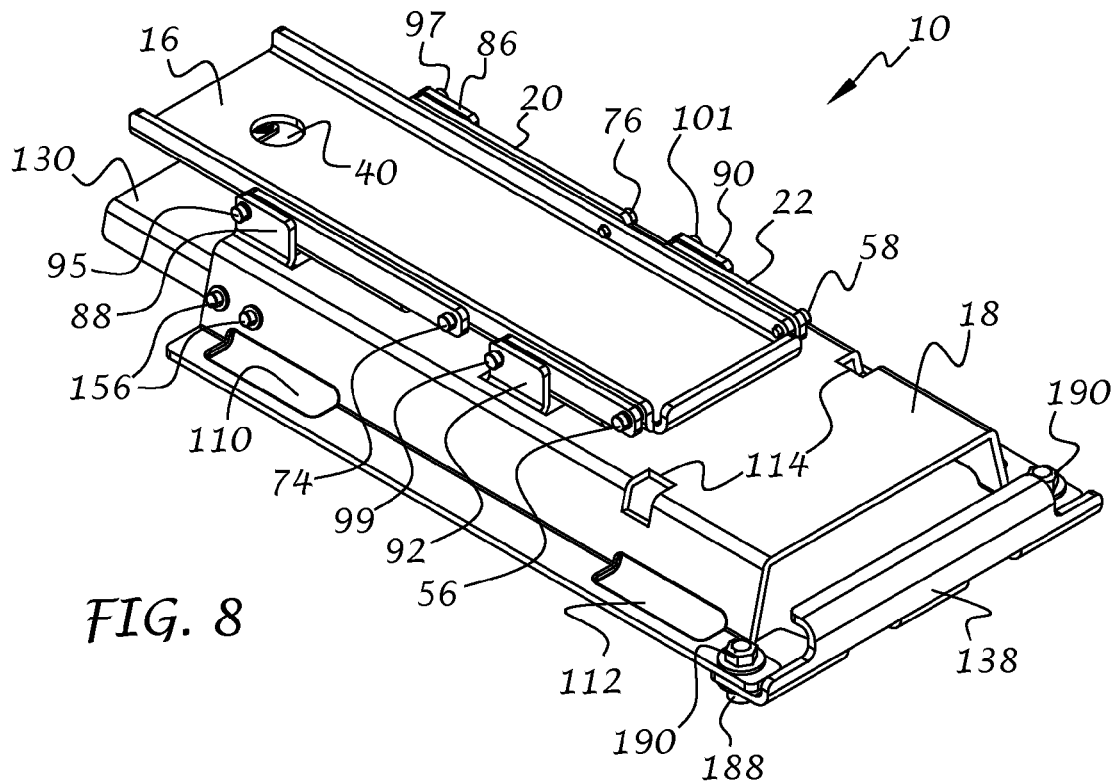
FIG. 8 is a bottom rear perspective view of the mounting assembly.
Figure 9:
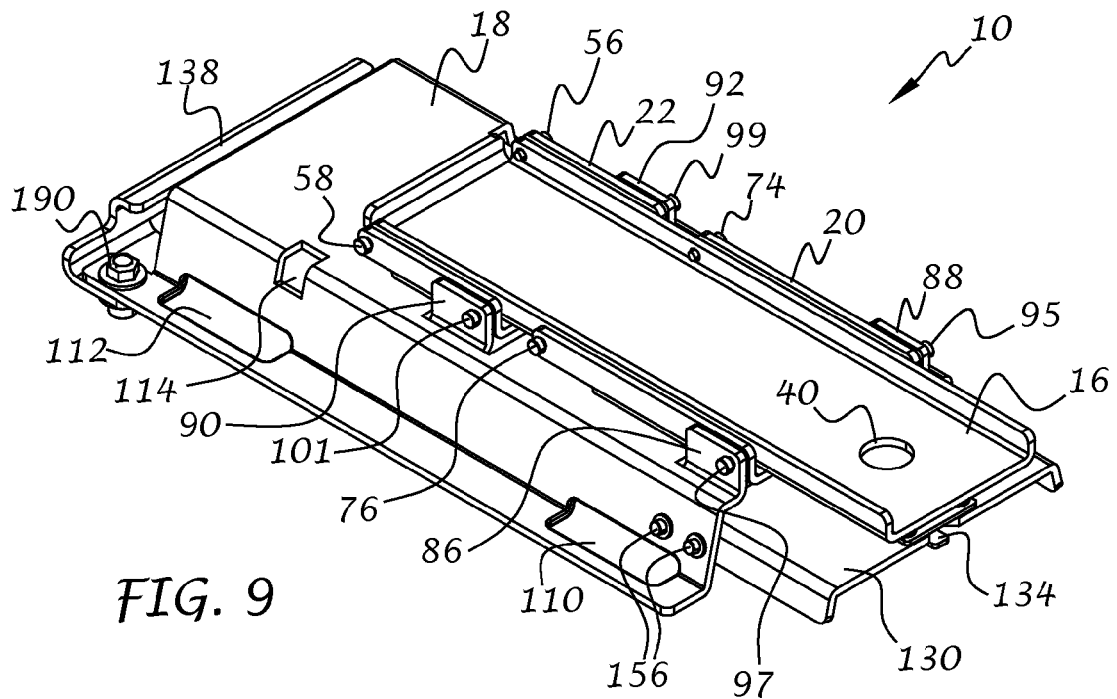
FIG. 9 is a bottom front perspective view of the mounting assembly.

The first pivot arm 20 preferably includes a first pivot plate 44 and a pair of second flanges or bars 46 and 48 that extend from the first pivot plate 44. Each of the second bars 46, 48 includes a leg portion 50 that extends beyond an edge 52 of the first pivot plate 44. A first pair of aligned apertures 54 and 55 are formed in the leg portions 50 of the second bars 46 and 48, respectively. Likewise, a second pair of aligned apertures 57 and 59 are formed in the second bars 46 and 48, respectively. When assembled, the apertures 54 and 55 are in alignment with the apertures 32 and 33, respectively, of the base member 16. A pin 56 (FIGS. 4, 8 and 9) extends through the aperture 32 of the base member 16 and the aligned aperture 54 of the first pivot arm 20. Likewise, a pin 58 (FIGS. 4, 8 and 9) extends through the aperture 33 of the base member and the aligned aperture 55 of the first pivot arm. In this manner, the first pivot arm can rotate about the pivot axis 36 with respect to the base member 16.

The second pivot arm 22 preferably includes a second pivot plate 60 and a pair of third flanges or bars 62 and 64 that extend from the second pivot plate 60. Each of the third bars 62, 64 includes a leg portion 66 that extends beyond an edge 68 of the second pivot plate 60. A first pair of aligned apertures 70 and 72 are formed in the leg portions 66 of the third bars 62 and 64, respectively. Likewise, a second pair of aligned apertures 73 and 75 are formed in the third bars 62 and 64, respectively. When assembled, the apertures 70 and 72 are in alignment with the apertures 34 and 35, respectively, of the base member 16. A pin 74 (FIGS. 4, 8 and 9) extends through the aperture 34 of the base member 16 and the aligned aperture 70 of the second pivot arm 22. Likewise, a pin 76 (FIGS. 4, 8 and 9) extends through the aperture 35 of the base member and the aligned aperture 72 of the second pivot arm. In this manner, the second pivot arm can rotate about the pivot axis 38 with respect to the base member 16.

Figure 10:
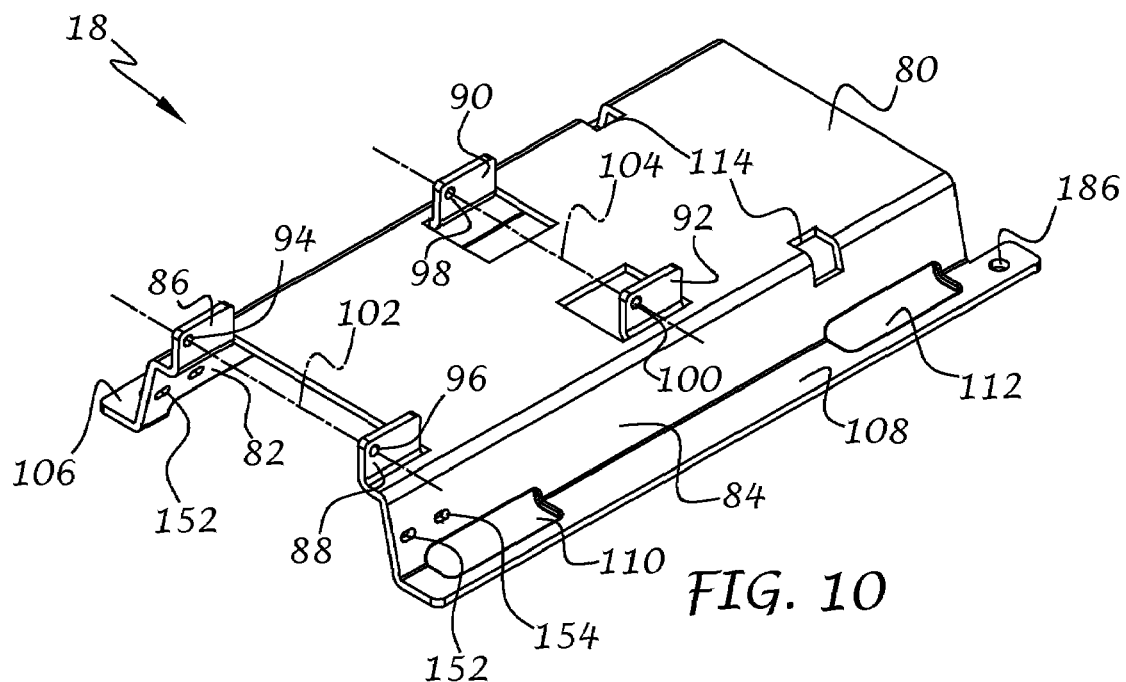
FIG. 10 is a bottom front perspective view of a cradle that forms part of the mounting assembly.
Figure 11:
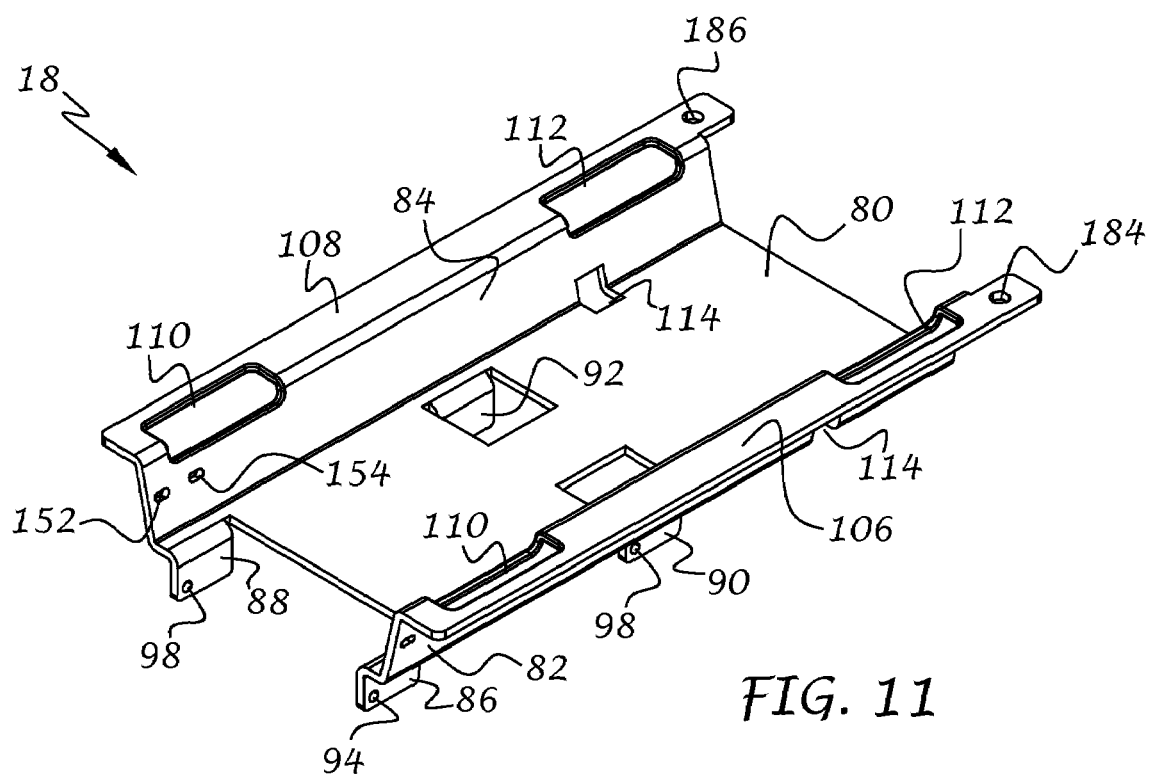
FIG. 11 is a top front perspective view of the cradle.

With reference now to FIGS. 3 and 6-11, the cradle 18 preferably includes an elongate floor or plate 80 that is adapted to support the weight of the container 14, a pair of side walls 82 and 84 that extend generally upwardly and outwardly from opposite sides of the floor 80, forward tabs 86, 88 and rearward tabs 90, 92 that extend generally downwardly from opposite sides of the floor. The forward tabs 86 and 88 include a pair of aligned forward apertures 94 and 96, respectively, that define forward pivot points and thus a forward pivot axis 102 (FIG. 10). When assembled, the apertures 94 and 96 are in alignment with the apertures 54 and 59 respectively. A pin 95 extends through the aligned apertures 94, 54 while a pin 97 extends through the aligned apertures 96, 59 to pivotally connect the first pivot arm 20 to the cradle 18. Likewise, the rearward tabs 90 and 92 include a pair of aligned rearward apertures 98 and 100, respectively, that define rearward pivot points and thus a rearward pivot axis 104. When assembled, the apertures 98 and 100 are in alignment with the apertures 73 and 75, respectively. A pin 99 extends through the aligned apertures 98, 73 while a pin 101 extends through the aligned apertures 100, 75 to pivotally connect the second pivot arm 22 to the cradle 18.

Figure 12:
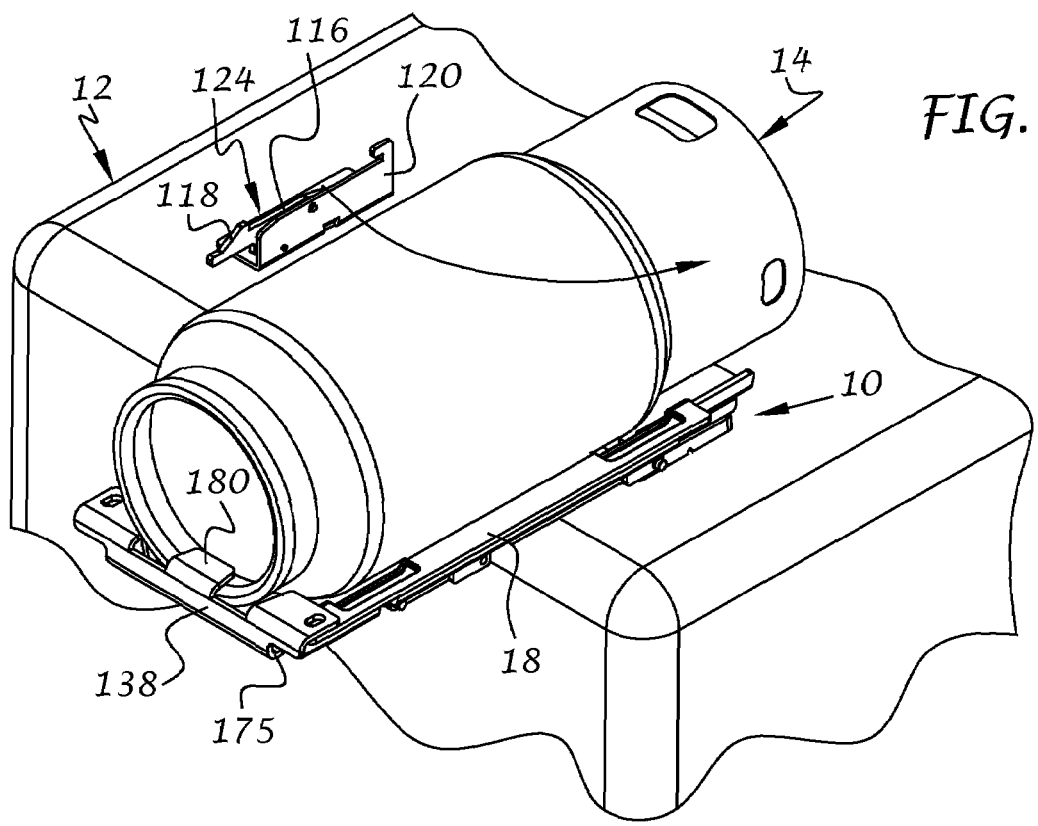
FIGS. 12-15 are perspective views of the container and mounting assembly showing sequential movement between an upper rotated position and a lower tank loading/unloading position.

Flanges 106 and 108 extend outwardly from each side wall 82 and 84, respectively. A pair of upper forward slots 110 and upper rearward slots 112 are preferably formed at the intersection of each flange and side wall. The slots 110 are elongate in shape to accommodate securing straps (not shown) for securing the container 14 to the cradle 18 in a well-known manner and/or as handles for lifting the cradle by an operator. A pair of lower rearward slots 114 are preferably formed at the intersection of each side wall 82, 84 and the floor 80. The slots 114 are sized for receiving the hook portion 118 (FIG. 12) of a spring-loaded latching member 116 that is mounted by way of a bracket 120 to the support structure 12. Preferably, the hook portion 118 includes a ramped surface 122 that is biased upwardly for engaging the slides of the slots 114 during a latching operation and a flat surface 124 for engaging the sides of the slots 114 in a locked position when the mounting assembly 10 is in the operational position (FIG. 1). In order to release the mounting assembly 10 from the operational position, the latch member 116 is pressed downwardly against spring pressure until the ramped surface 122 can be slid through the slots 114.

Preferably, the floor 80, side walls 82, 84, forward tabs 86, 88 and rearward tabs 90, 92 and apertures of the cradle 18 are formed by stamping and bending a single sheet of metallic material. However, it will be understood that the cradle 18 may be constructed of different materials, such as plastics, composites, and/or any other suitable material. It will be further understood that the cradle 18 can be formed by machining, extrusion, molding, or any other well known forming means. In addition, although the floor, side walls and tabs are shown as a unitary structure, they may be formed separately and attached together using well-known attaching techniques such as welding, adhesive bonding, fastening, and so on.

Figure 15:
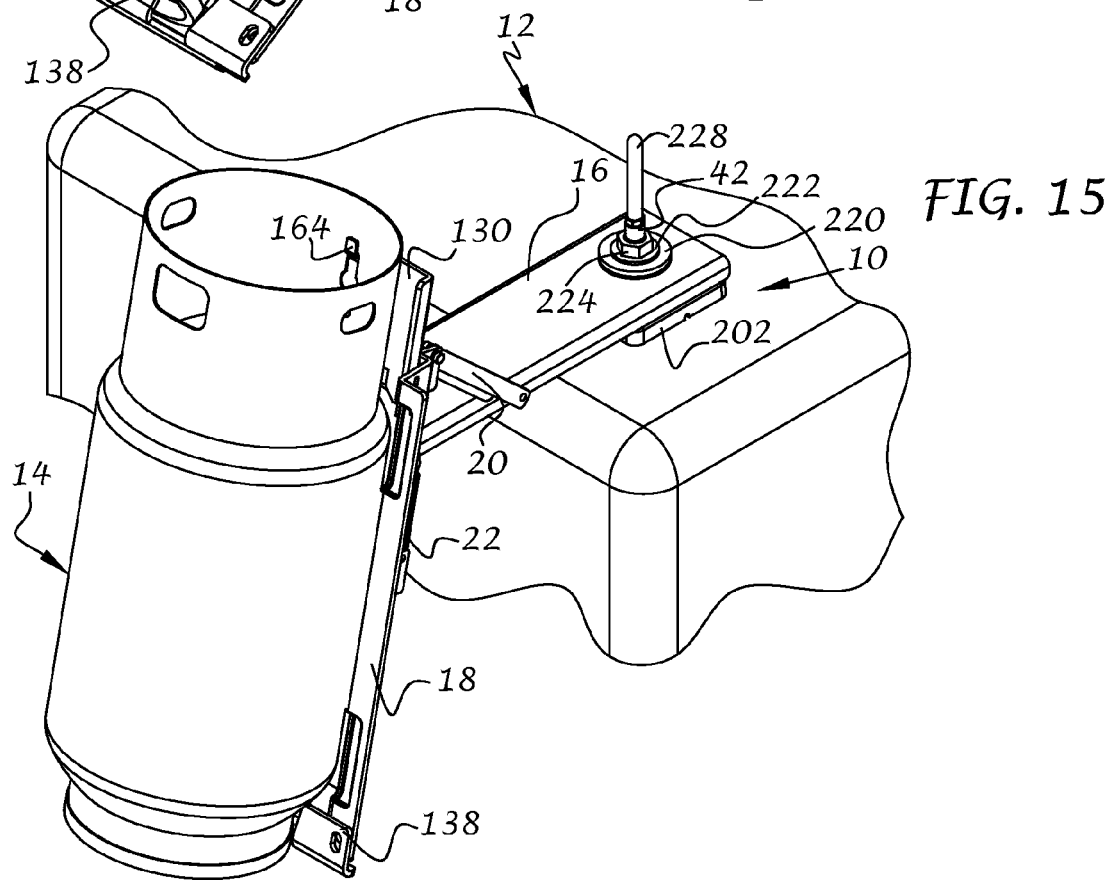

It will be understood that the term "bar" as used throughout the specification and claims refers to any structure or combination of structures or elements located between relatively fixed or moving pivot points. By way of example, the floor and/or wall portions of the cradle 18 located between the apertures (pivot points) 94 and 98 of the tabs 86 and 90 may be considered a bar. Likewise, each portion of the flanges 26, 28 and/or the plate 24 of the base member 16 located between the apertures or pivot points 32, 33 and 34, 35 may also be considered a bar. Thus, the mounting assembly 10 according to a first preferred embodiment utilizes a pair of four-bar linkage systems to move the cradle 18 between an upper rest position (FIG. 12) and a lower loading/unloading position (FIG. 15). The first four-bar linkage system comprises a first bar including a portion of the flange 26 between the apertures 32, 34 of the base member 16, the second bar 46 of the first pivot arm 20, the third bar 62 of the second pivot arm 22, and the fourth bar comprising the tabs 86, 90 and the floor and/or wall portions of the cradle 18 located between the apertures 94 and 98 of the tabs. Likewise, the second four-bar linkage system comprises a first bar including a portion of the flange 28 between the apertures 33, 35 of the base member 16, the second bar 48 of the first pivot arm 20, the third bar 64 of the second pivot arm 22, and the fourth bar comprising the tabs 88, 92 and the floor and/or wall portions of the cradle 18 located between the apertures 96 and 100 of the tabs. Although in this embodiment the pivot points are relatively fixed, it is understood that the pivot points may be adapted for sliding movement as will be described in further detail below with reference to FIGS. 25 and 26.

The provision of plates 44, 60 between the bars of the first and second pivot arms ensures a highly stable platform during rest and movement between the FIG. 1 and FIG. 15 positions. It will be understood that the tabs 86, 90 and 88, 92 of the cradle 18 can be replaced with respective elongate flanges, bars, or other structure. It will be further understood that the plates 44, 60 can be eliminated depending on the load requirements, bar dimensions, construction of the pivot joints, and so on.

Figure 3:
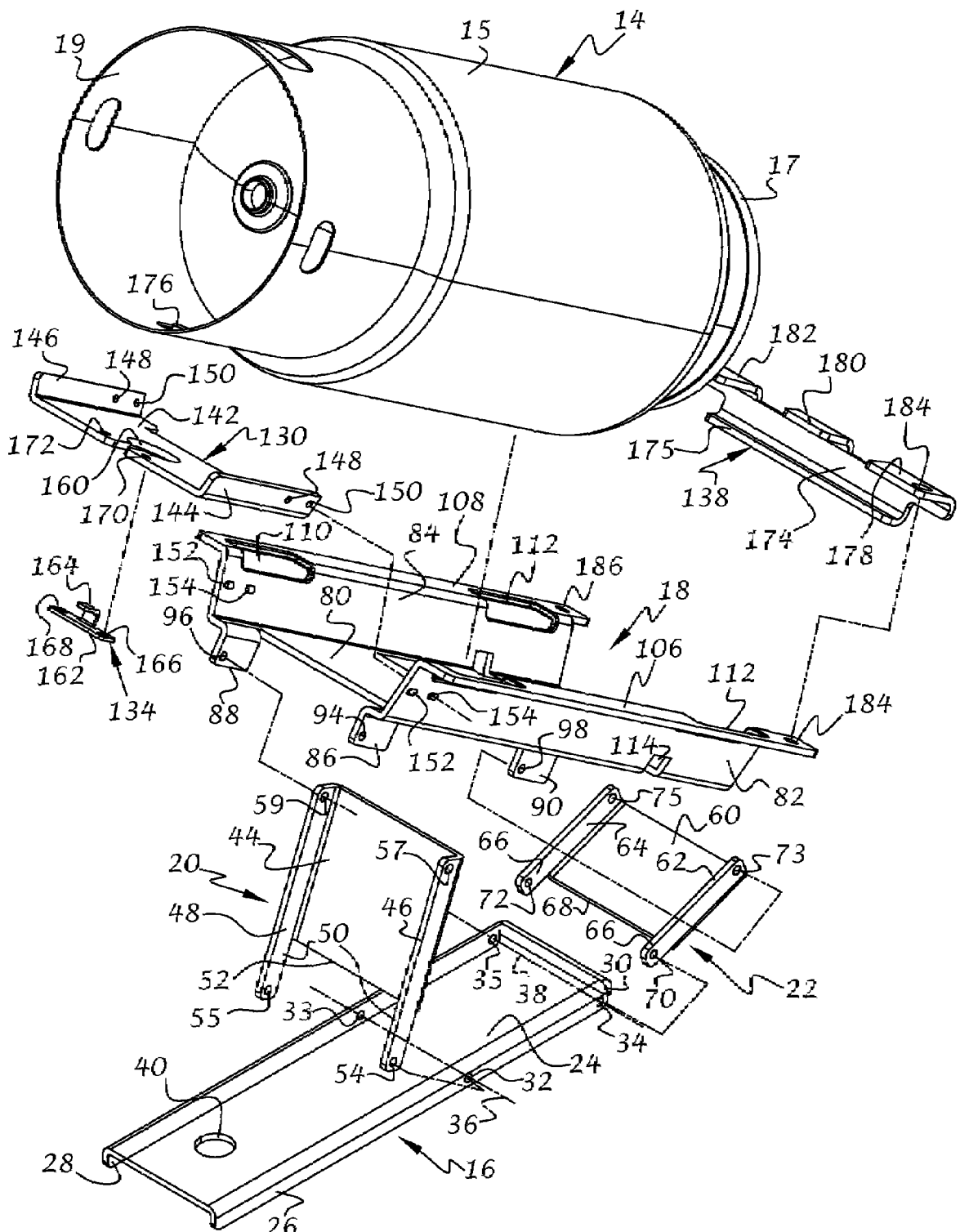
FIG. 3 is a left front exploded perspective view of the container and mounting assembly.
Figure 4:
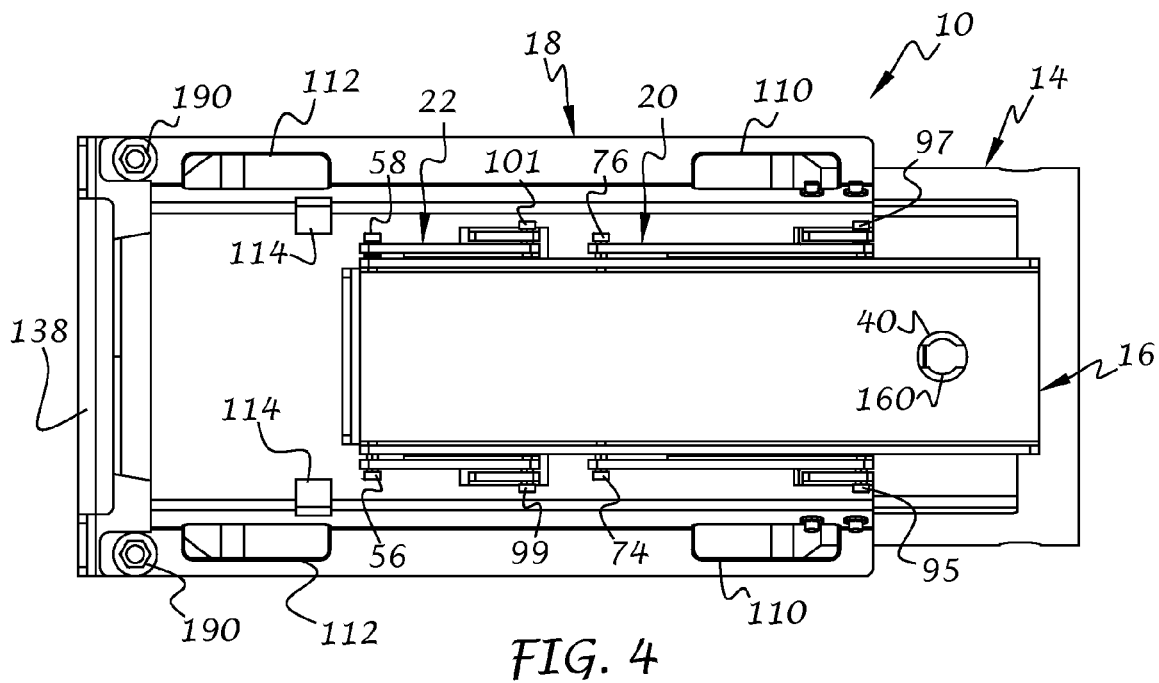
FIG. 4 is a bottom plan view of the mounting assembly.
Figure 6:
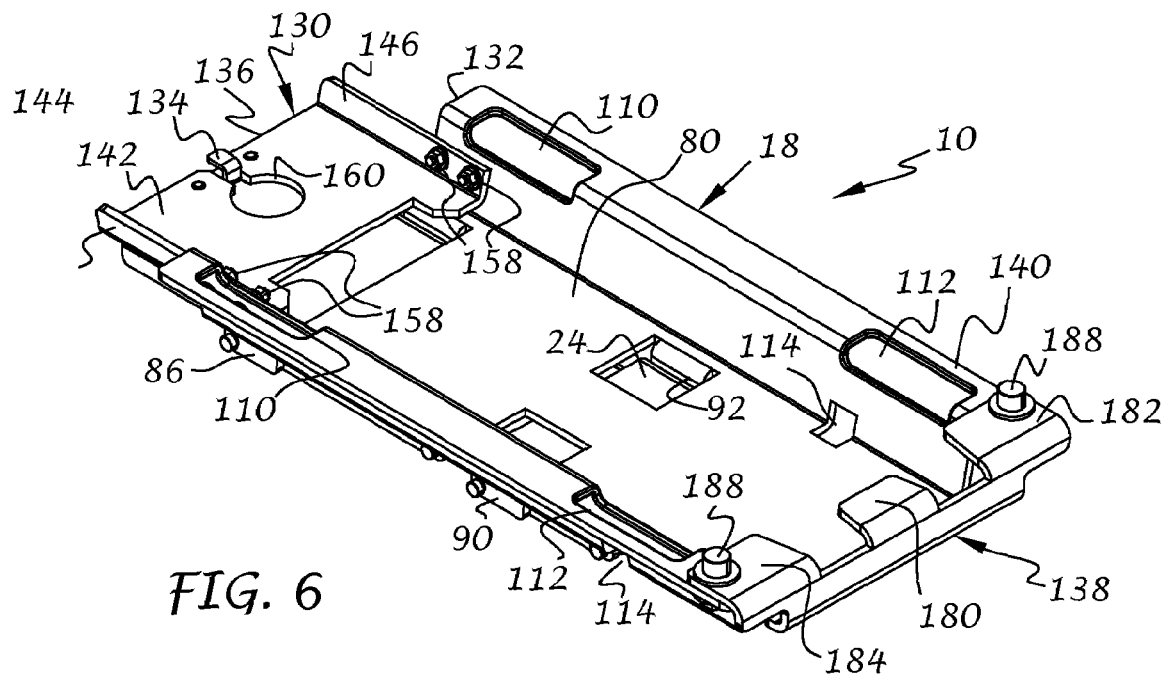
FIG. 6 is a left rear perspective view of the mounting assembly.
Figure 7:
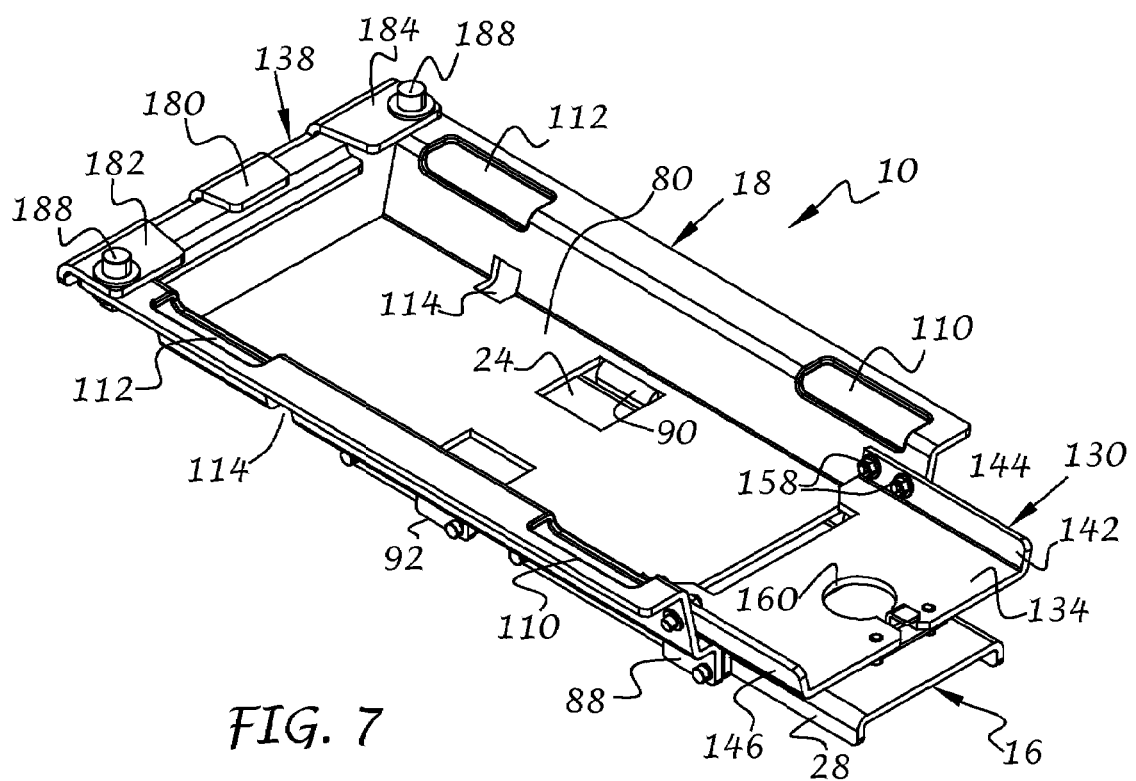
FIG. 7 is a right front perspective view of the mounting assembly.

Referring to FIGS. 3, 6 and 7, a first mounting bracket 130 is preferably attached to a forward end 132 of the cradle 18 and a hook member 134 is in turn attached to a forward end 136 of the first mounting bracket 130. Likewise, a second mounting bracket 138 is preferably attached to a rearward end 140 of the cradle 18. The first and second mounting brackets together with the securing straps (not shown) ensure that the tank 14 is firmly held on the cradle 18 both during use and movement between the rest position and the lower loading/unloading position.

Figure 5A:
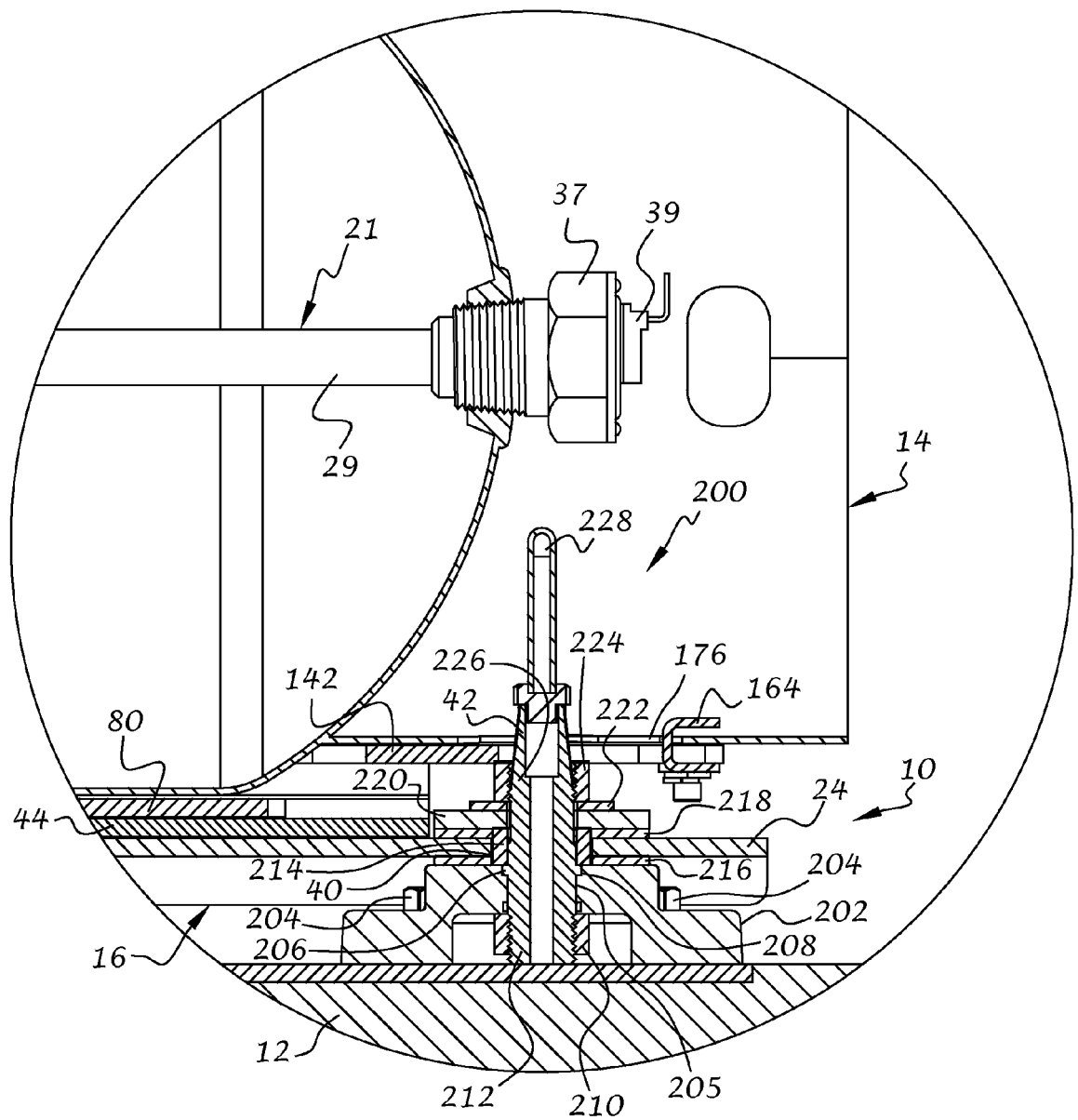
FIG. 5A is an enlarged sectional view taken along circle 5A of FIG. 5.

The first mounting bracket 130 preferably includes a plate 142 and walls 144 and 146 that extend upwardly from opposite sides of the plate 142. Each of the walls 144, 146 includes a pair of apertures 148 and 150 that are aligned with respective apertures 152 and 154 formed in the walls 82 and 84 of the cradle 18 when assembled. Preferably, a bolt 156 extends through each aperture and is secured by a nut 158 and lock washer (not labeled) in a well-known manner. An opening 160 is formed in the plate 142 for accommodating the pintle 42 (FIGS. 1, 5 and 5A).

The hook member 134 preferably includes a flat mounting portion 162 and an L-shaped hook portion 164 extending upwardly from the mounting portion. Apertures 166 and 168 are formed in the mounting portion 162 and are in alignment with apertures 170 and 172, respectively, formed in the plate 142 of the first mounting bracket 130. A bolt 174 (FIG. 7) extends through each pair of aligned apertures and a nut (not labeled) is threaded onto each bolt to secure the hook member 134 to the underside of the plate 142. The hook portion 164 is adapted to engage an edge of a slot 176 (FIGS. 3 and 5A) of the annular wall 19 for holding a top or forward end of the container 14.

The second mounting bracket 138 preferably has a wall 174 with a lower flange 175 and upper tabs 178, 180 and 182 that extend forwardly from opposite sides of the wall 174. Each tab 178 and 182 has an aperture 184 (only one shown in FIG. 3) that is in alignment with one of the apertures 184, 186 formed at a rear end of the cradle flanges 106, 108, respectively. A bolt 188 (FIG. 7) extends through each pair of aligned apertures and a nut 190 (FIG. 4) is threaded onto each bolt to secure the second mounting bracket 138 to the carriage 18. The center tab 180 is adapted to engage the edge of the annular base 17 (FIG. 5) of the container 14 for holding a bottom or rearward end of the container.

Although the first and second mounting brackets are preferably formed separately and attached to the cradle through mechanical fastening, it will be understood that the mounting brackets can be attached by welding, adhesive bonding, etc., or may be formed as a single unitary structure such as by machining, molding, bending or any other well known forming means.

Referring now to FIG. 5A, a pivot assembly 200 for pivotally connecting the mounting assembly 10 to the support structure 12 of a vehicle or stationary equipment is illustrated. The pivot assembly 200 preferably includes a mounting base 202 connected to the support structure 12 via bolts 204 that extend through apertures (not shown) in the mounting base and thread into the support structure. Alternatively, the mounting base 202 may be attached to the support structure 12 by welding, adhesive bonding or other securing means. The pintle 42 is positioned in a central bore 205 of the mounting base and includes an annular lip 206 that rests in an annular groove 208 of the mounting base. The annular groove is preferably concentric with the central bore 205. A nut 210 is threaded onto a lower threaded end 212 of the pintle 42 that, in conjunction with the annular lip 206, fixedly secures the pintle 42 to the mounting base 202. A sleeve 214 is positioned over the pintle 42 and rests on the mounting base 202. The base member 16 is rotatably positioned on the pintle 42 with the hole 40 of the plate 24 concentric with the sleeve 214. A first annular bearing disk 216 is preferably positioned between a lower surface of the plate 24 and the mounting base 202 while a second annular bearing disk 218 is positioned between an upper surface of the plate 24 and an annular bearing retainer 220. A washer 222 is positioned on the annular bearing retainer 220 and a nut 224 is threaded on an upper threaded portion 226 of the pintle 42 to rotatably secure the base member 16 to the pintle 42. Preferably, the bearing disks 216 and 218 are constructed of a rigid material that can withstand the various loads created by the mounting assembly 10 and accompanying container 14 during movement or at any stationary position. The sleeve 24 ensures a tightly controlled rotating clearance. Suitable materials may include, but are not limited to, brass, iron, steel or other metals, nylon or other plastics, composites, brake-type materials commonly used in brake pads, and so on. It will be understood that other means for mounting and/or pivoting the mounting assembly 10 can be utilized.

When the container 14 is in the form of a propane cylinder or the like, a magnetic sensor 228, such as a hall-effect device, is preferably connected to the pintle 42 for sensing the position of the pointer magnet (not shown) in the fuel gauge 21 when the container 14 is in the operational position (FIG. 1). In this manner, the sensor 228 can sense a liquid fill condition of the container 14 independent of direct mechanical or electronic indication by the fuel gauge. Preferably, the sensor 228 is highly sensitive and is therefore oriented to detect magnetic flux from the pointer magnet (not shown) in a plane that is generally perpendicular to the Earth's magnetic field. In this manner, false liquid level signals that may otherwise occur due to the sensitive nature of the sensor 228 can be minimized or eliminated. Signals from the sensor 228 can be electrically or wirelessly transmitted to a remote location, preferably viewable by the forklift operator or other person responsible for cylinder replacement, in order to determine an empty or near-empty condition of the container and thus the ideal time for replacing the container.

Referring now to FIGS. 1, 5 and 12-15, the mounting assembly 10 and container 14 are initially in the operational position as shown in FIG. 1 on the forklift or other vehicle or stationary equipment, with the hook portion 118 of the latching member 116 engaging the slots 114 of the cradle 18 to hold the mounting assembly against rotation about the pintle 42 (FIG. 5). In this position, the plate or floor 80 of the cradle 18 and the plates 44, 60 of the first and second pivot arms 20, 22 are juxtaposed. Likewise, the plates 44, 60 and the plate 24 of the base member 16 are juxtaposed (see FIG. 5). In this manner, the mounting assembly is very low in profile and therefore minimizes the added height of the container 14.

Figure 13:
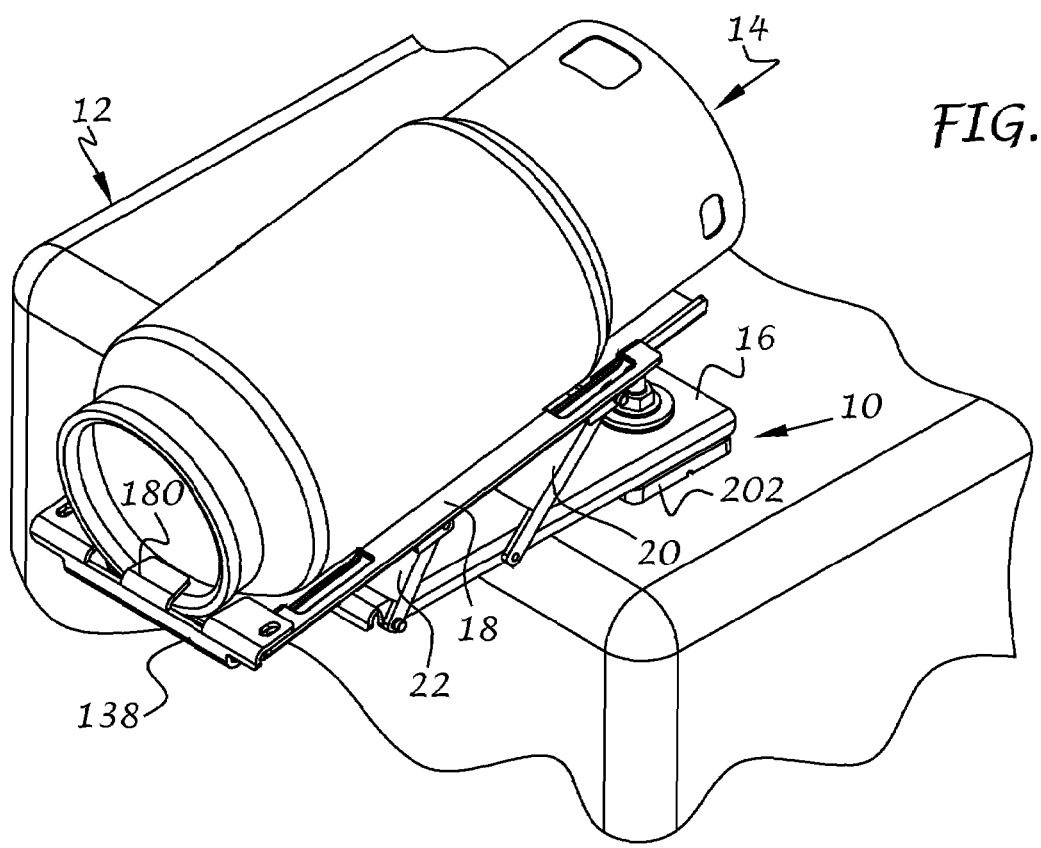
Figure 14:
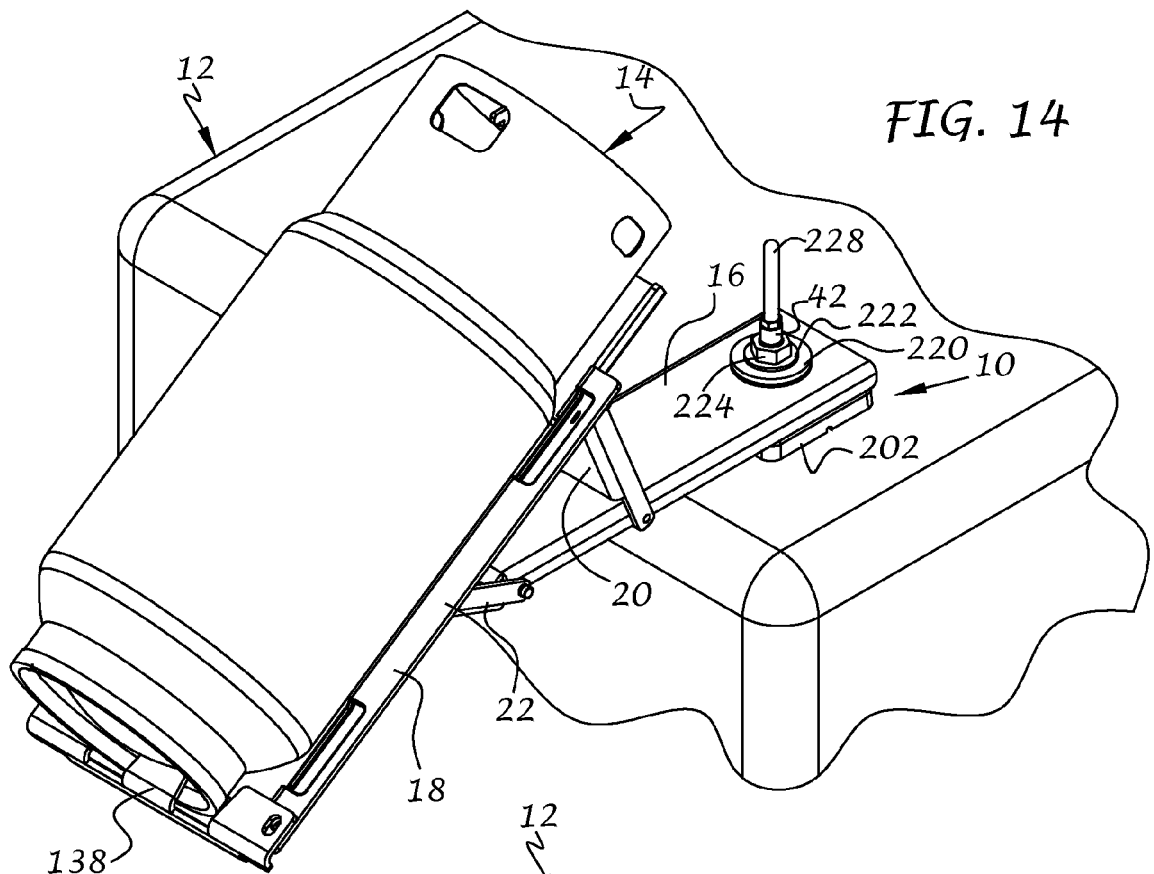

When it is determined that the container 14 should be replaced, such as during a sensed low liquid level condition as described above, the mounting assembly 10 is released from the operational position by pressing downwardly on the latch member 116 against spring pressure until the ramped surface 122 of the hook portion 118 can be slid through the slots 114. The entire mounting assembly 10 with the attached container 14 can then be rotated about the pintle 42 to the FIG. 12 position. Subsequently, the cradle is lifted upwardly and rearwardly as shown in FIG. 13 by grasping the lower flange 175 of the second mounting bracket 138 which serves as a handle, then downwardly and rearwardly as shown in FIG. 14, until the cradle 18 and container 14 are in the lower loading/unloading position. The nature of the upward and rearward movement of the cradle 18 depends on the length of the first and second pivot arms as well as the distance between pivot points on both the base member 16 and cradle 18. In the lower position (FIG. 15), the first and second mounting brackets 130, 138 ensure that the container 14 stays in position when the securing straps (not shown) are removed. In order to remove the container 14 from the cradle 18 in the lower position, the securing straps (not shown) are removed and the container 14 is lifted upwardly until the bottom of the container clears the second mounting bracket 138 and the top of the container clears the first mounting bracket 130. The container can then be moved away from the cradle. Installation of the container is performed in the reverse manner. Preferably, the length of the hook 164 is less than the length of the tab 180 so that the container 14 may be pivoted into and out of position with respect to the cradle 18 during loading and unloading. In this manner, the opening 176 of the container 14 can be easily aligned with the pintle 42 without operator strain since the bracket 138 bears the weight of the container during pivoting and/or rotating movement of the tank into position on the cradle.

Figure 16:
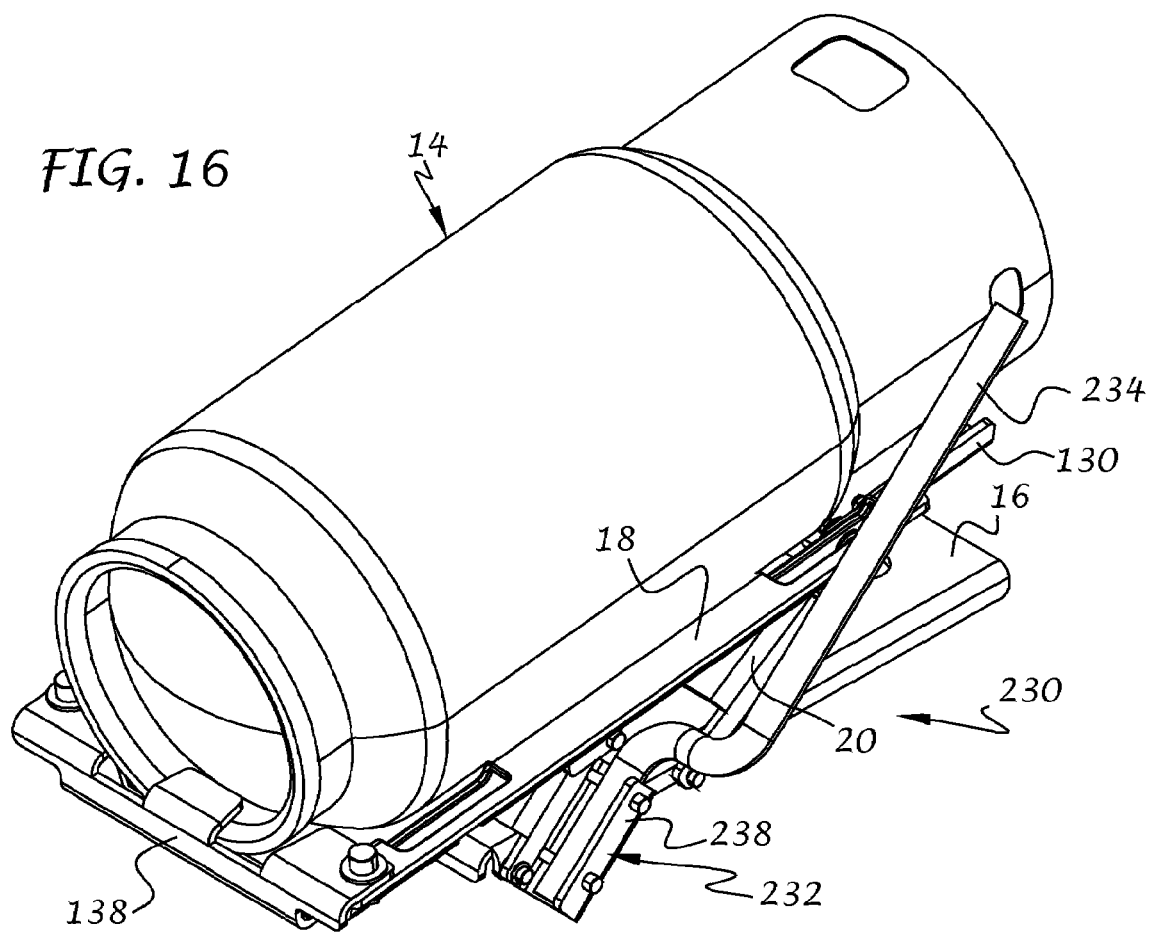
FIG. 16 is a right front perspective view of a container coupled to a mounting assembly in accordance with another preferred embodiment of the invention.
Figure 17:
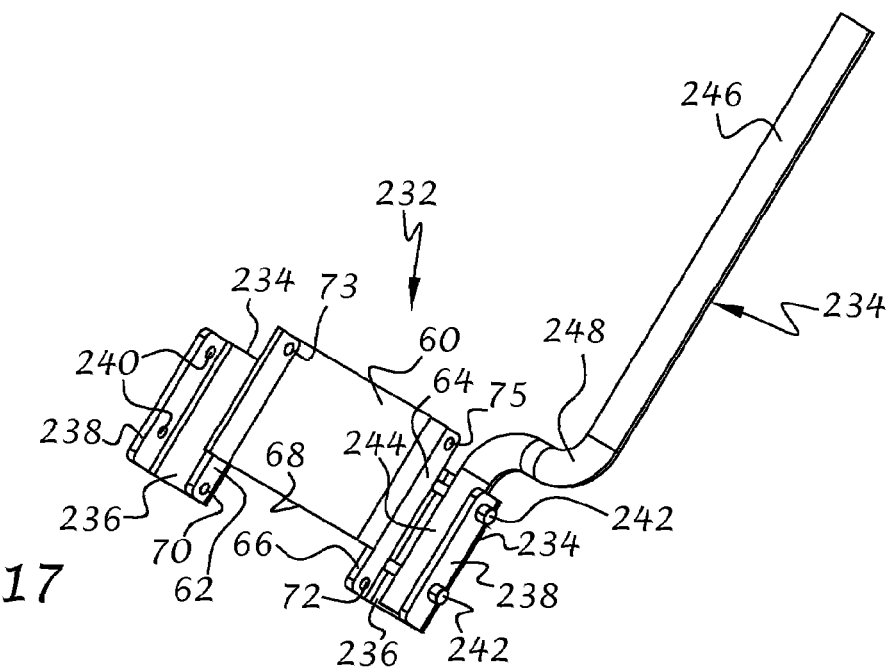
FIG. 17 is a right front perspective view of a handle unit that forms part of the mounting assembly of FIG. 16.
Figure 18:
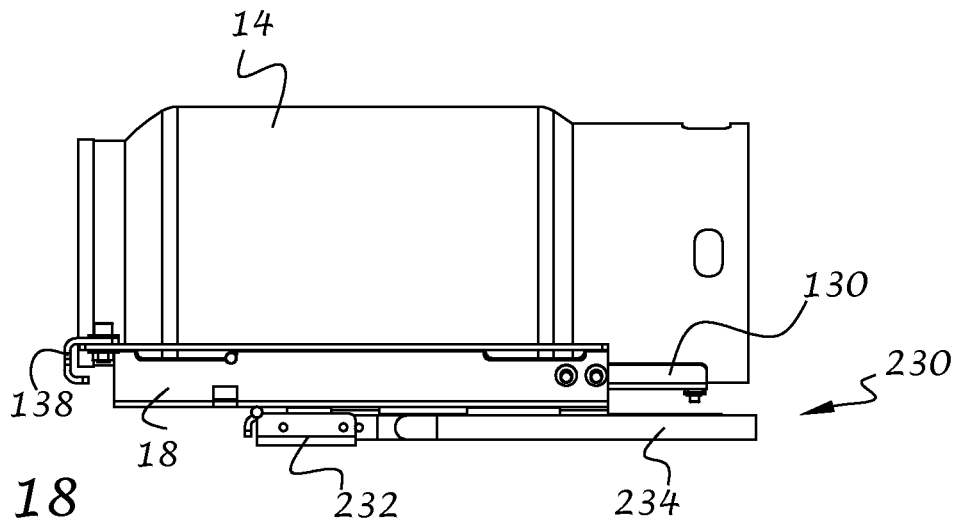
FIGS. 18-24 are side elevational views of the mounting assembly and attached container of FIG. 16 showing sequential movement between an upper rotated position and a lower loading/unloading position.

Referring now to FIGS. 16 and 17, a mounting assembly 230 in accordance with a further preferred embodiment of the invention is illustrated. The mounting assembly 230 is similar in construction to the mounting assembly 10 with the exception that the second pivot arm 232 has been modified to receive a handle 234. As shown, the second pivot arm 232 includes the second pivot plate 60 and the pair of second flanges or bars 62 and 64 that extend from the second pivot plate 60 with accompanying leg portions 66 that extend beyond the edge 68. A first pair of aligned apertures 70 and 72 are formed in the leg portions 66 while a second pair of aligned apertures 73 (shown in hidden line) and 75 are formed in the second bars 62 and 64, respectively, which serve as pivot points as previously described so that the second pivot arm can rotate with respect to the base member 16. An L-shaped handle bracket 234 is preferably connected to each flange 62, 64 and includes a first leg 236 that extends generally perpendicular from its associated flange and a second leg 238 that extends generally perpendicular from the first leg 236. Spaced apertures 240 are formed in each second leg to receive fasteners 242 for securing the handle 234 to the second pivot arm 232.

The handle 234 is preferably tubular in construction and includes a first handle portion 244 that is received between the second leg 238 and one of the flanges 62, 64, a second handle portion 246, and a double-curved portion 248 connecting the first and second handle portions together. The first handle portion 244 preferably includes apertures (not shown) in alignment with the apertures 240 so that the handle is fixedly secured by the fasteners 242 extending therethrough. The fasteners 242 may be in the form of bolts, pins, devises, and so on. Alternatively, the handle 234 may be connected to the second pivot arm 232 by welding, bonding, strapping, or any other attachment means. The offset nature of the second handle portion 246 with respect to the first handle portion 244 ensures that there will be adequate clearance between the cradle 18 and the hand of a user during operation. In addition, the provision of two handle brackets permits the handle 234 to be installed on the right and/or left sides of the cradle 18.

Figure 19:
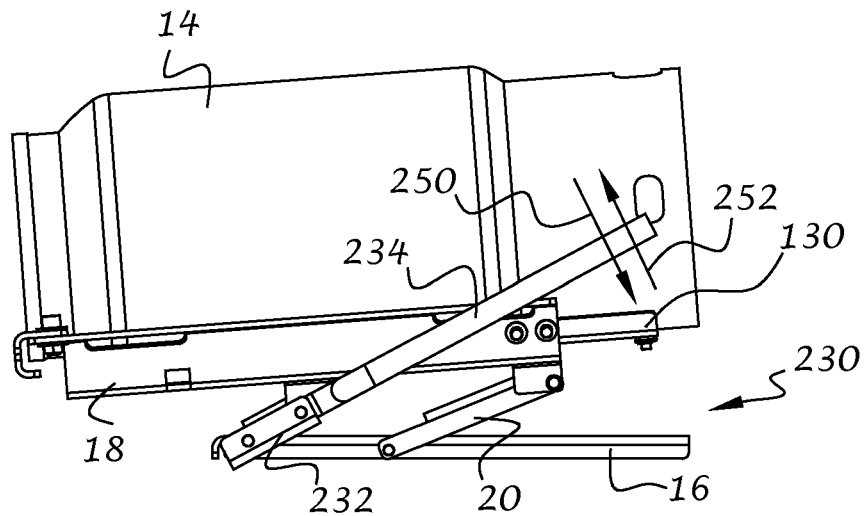
Figure 20:
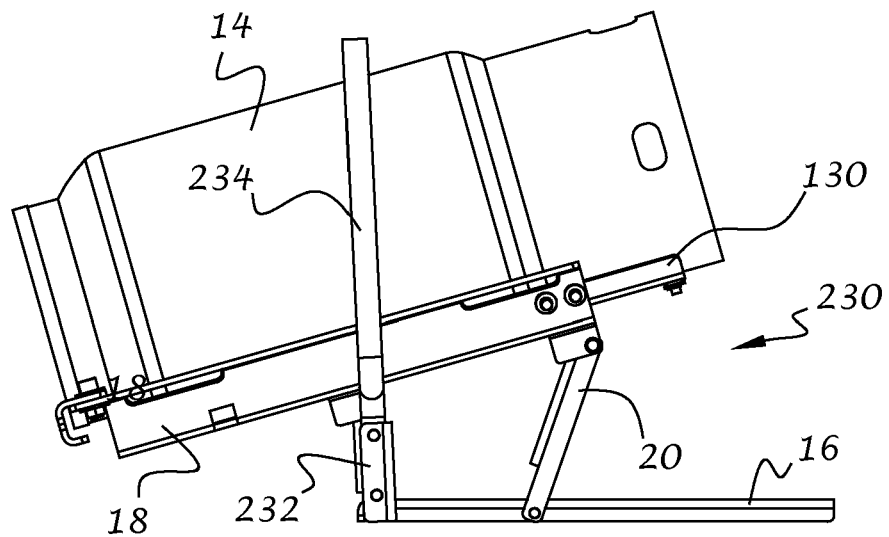
Figure 21:
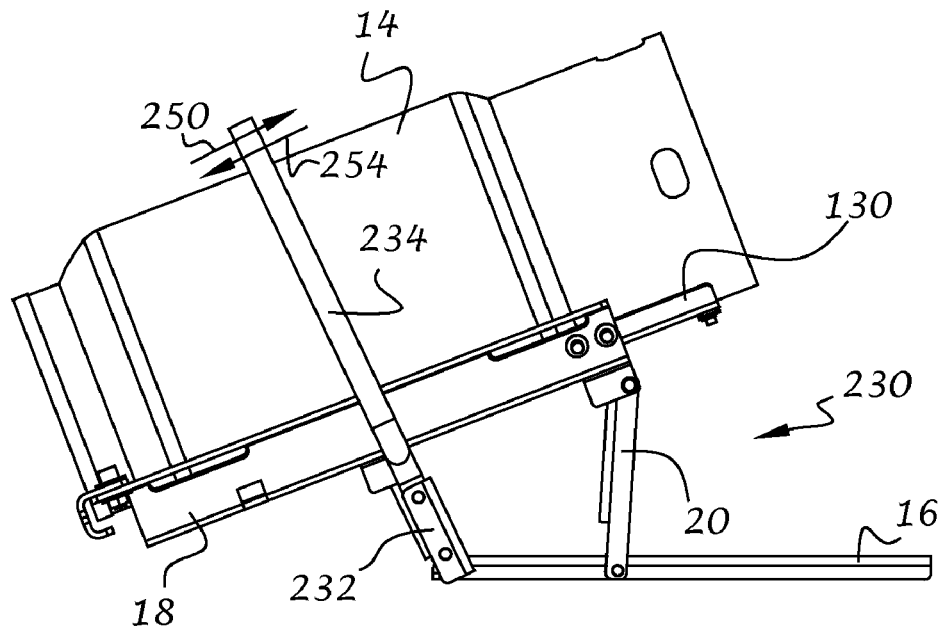
Figure 22:
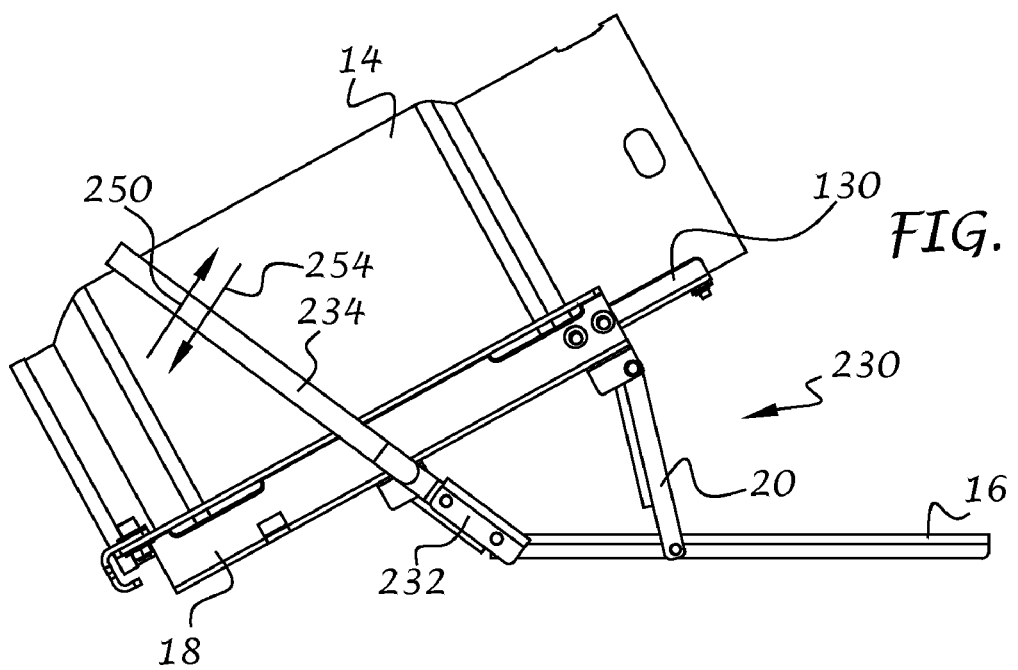
Figure 23:
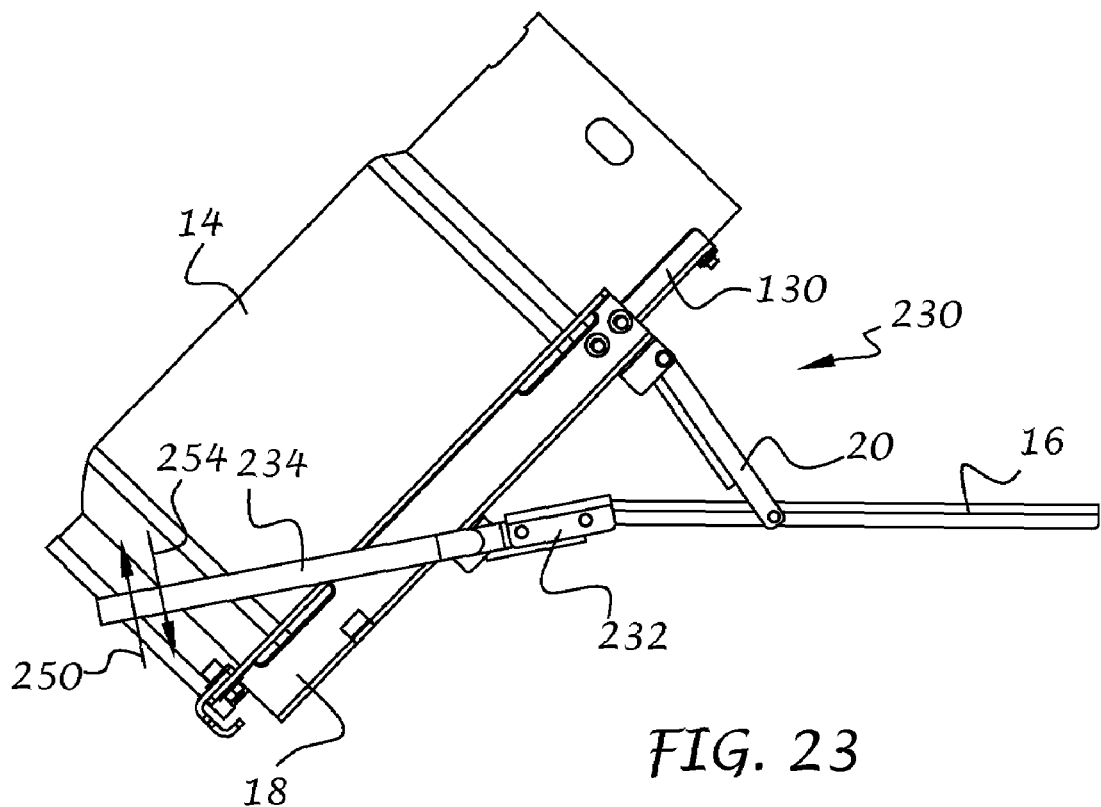
Figure 24:
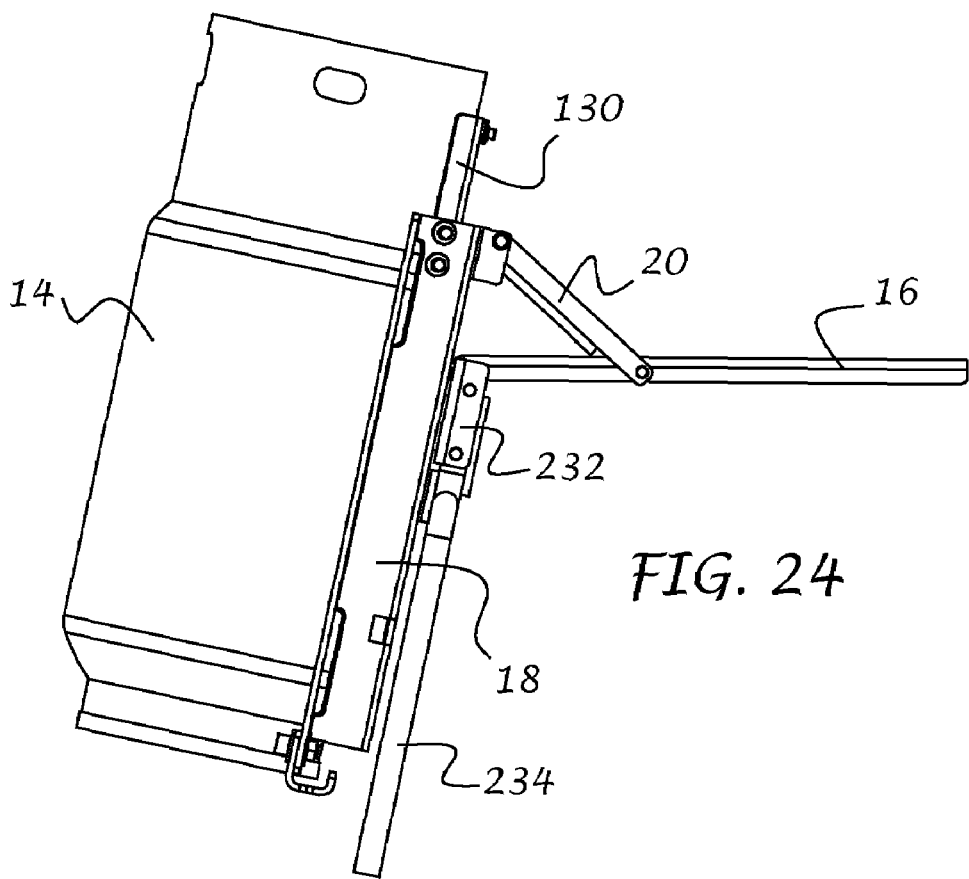

In use, and with additional reference to FIGS. 18-24, once the mounting assembly 230 and attached container 14 are moved to the rotated position (FIG. 18) from the locked position, the handle 234 is grasped and pulled rearwardly by a user in a direction represented by arrow 250 to thereby cause rotation of the second pivot arm 232, first pivot arm 20, and the cradle 18 with respect to the base member 16 in an upward and rearward direction, as shown in FIG. 19. During movement, an opposing torsional force on the handle 234, as represented by arrow 252 in FIG. 19, caused by the weight of the various components is advantageously overcome with relatively little effort from the user due to the strategic placement of the handle 234 on the shorter pivot arm, which effectively increases the rotational movement of the shorter pivot arm with respect to the longer pivot arm to thereby reduce the force required to overcome the opposing torsional force. As the handle is moved toward the vertical position in FIG. 20, the opposing force will reduce in value until the over-center position is reached whereupon the forces will be balanced so that no opposing force is felt by the user. As the handle continues to rotate downwardly, as shown in FIGS. 21-24, the opposing torsional force will be exerted on the handle in the opposite direction, as represented by arrow 254 and increase in value. In the lower position (FIG. 24), the container 14 can be removed and replaced as described with respect to the previous embodiment.

Figure 25:
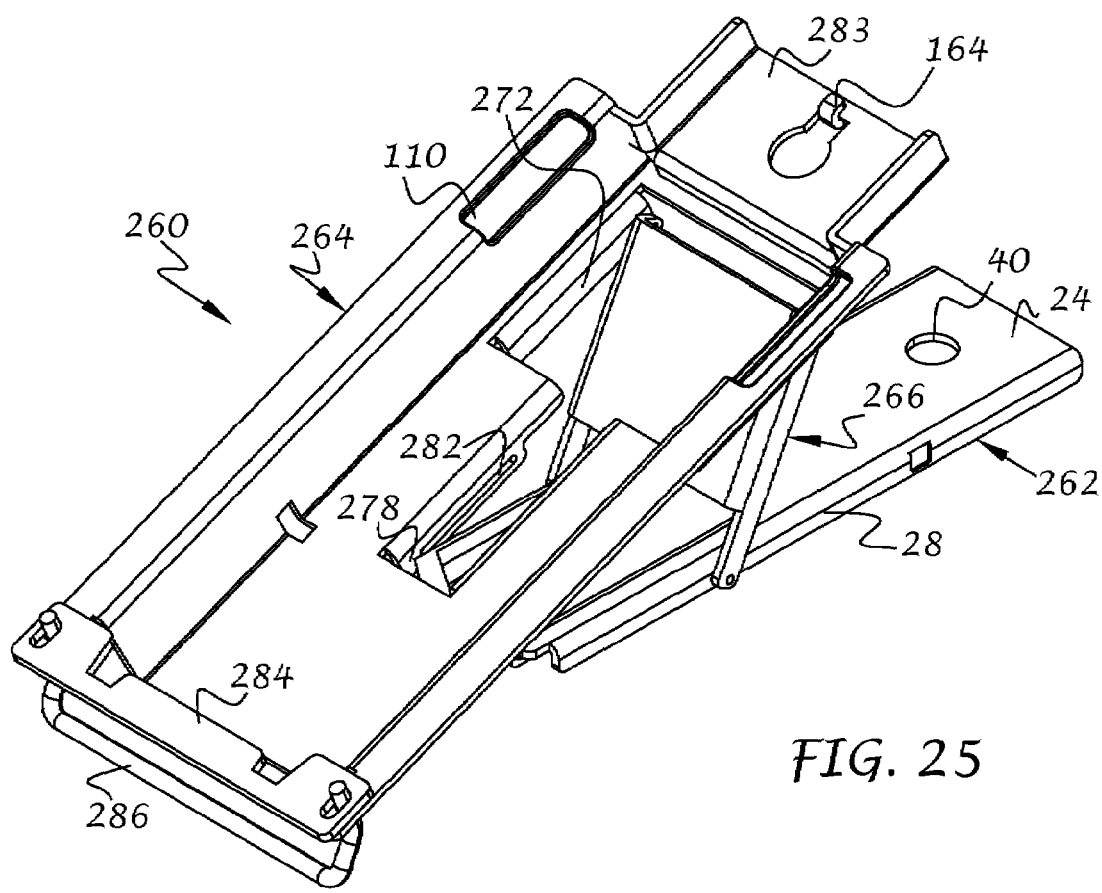
FIG. 25 is an upper perspective view of a mounting assembly in accordance with a further preferred embodiment of the invention.
Figure 26:
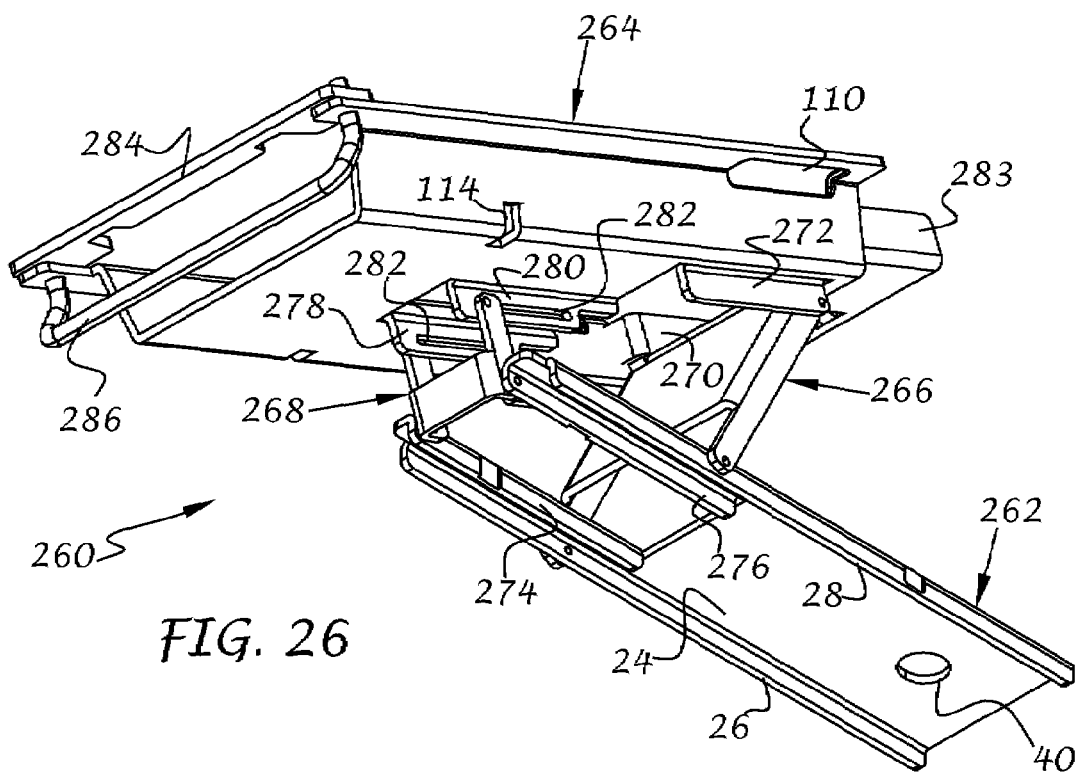
FIG. 26 is a lower perspective view of the mounting assembly of FIG. 25.

Referring now to FIGS. 25 and 26, a mounting assembly 260 in accordance with another preferred embodiment of the invention is illustrated. The mounting assembly 260 is somewhat similar in construction to the mounting assembly 10 and includes a base member 262 for connection to a support structure (not shown), a cradle 264, a first pivot arm 266 and second pivot arm 268 that are rotatably connected to the base member 262 and the cradle 264. Preferably, the second pivot arm 268 is shorter and narrower than the first pivot arm 266 and both pivot arms are strategically positioned at predefined pivot points or axes on the base member 16 and cradle 18 so that the cradle moves along a predefined pathway with respect to the base member, as previously described. As shown, one end of the first pivot arm 266 is pivotally connected to outer flanges 26, 28 of the base member 262 while the opposite end is connected to downwardly projecting forward tabs 270 and 272 of the cradle 264. Likewise, one end of the second pivot arm 268 is connected to inner flanges 274, 276 of the base member 252 while the opposite end is connected to downwardly projecting rearward tabs 278 and 280 of the base member. Preferably, a longitudinal slot 282 is formed in each tab 278, 280 and the opposite end of the second pivot arm 268 is mounted for sliding and pivoting movement within the slots. Alternatively, the longitudinal slots 282 may be formed in the inner flanges 274, 276. With this construction, the cradle 264 is capable of moving to a lower position than the previous embodiments to thereby facilitate removal and replacement of a container. It will be understood that the previous embodiments may also include one or more slots for increased range of motion.

A first mounting bracket 283, similar in construction to the first mounting bracket 130 (FIG. 6), is preferably integrally formed with the forward end of the cradle 264. A second mounting bracket 284, similar in construction to the second mounting bracket 138, is connected to the rearward end of the cradle 264 by means of a handle 286 that extends through apertures (not labeled) in the cradle and second mounting bracket 284. The handle can be affixed to the cradle in any well-known manner and is adapted for grasping by a user to facilitate movement of the mounting assembly 260.

In yet a further preferred embodiment of the invention, the second pivot arm 268 may be eliminated and the base member can be directly connected to the slots 282 in the tabs 278, 280 for direct sliding and rotating action of the cradle 264 with respect to the base member 262 upon rotation of the first pivot arm 266.

Although the base members 16, 262 of the previous embodiments are shown as separate elements from the support structure of the forklift, vehicle or stationary equipment, it will be understood that the base member may be integrally formed with the support structure. In accordance with a further preferred embodiment of the invention, the base member may comprise separate brackets, protrusions, etc. located on the support structure or forming part of the support structure for pivotally and/or slidably connecting the first and second pivot arms.

It will be understood that terms of orientation and/or position as used through the specification, such as front, rear, side, top, bottom, and so on, as well as their derivatives and equivalent terms, refer to relative rather than absolute orientations and/or positions.

While the invention has been taught with specific reference to the above-described embodiments, those skilled in the art will recognize that changes can be made in form and detail without departing from the spirit and the scope of the invention. By way of example, each of the above embodiments may incorporate a counterweight, spring or other counterbalancing means to reduce the lifting load during movement of the mounting assembly and accompanying container between the operating position and the lower loading/unloading position. Thus, the described embodiments are to be considered in all respects illustrative and not restrictive. The scope of the invention is, therefore, indicated by the appended claims rather than by the foregoing description. All changes that come within the meaning and range of equivalency of the claims are to be embraced within their scope.

What is claimed is:

1. A mounting assembly for holding and moving a container between a first generally horizontal operational position and a second generally vertical lower loading/unloading position with respect to a support structure, the mounting assembly comprising:
   a base member adapted for connection to the support structure;
   a cradle for supporting the container between the first and second positions; and
   first and second pivot arms, each pivot arm having a first end pivotally connected to the base member and a second end pivotally connected to the cradle;
   wherein movement of the cradle from the first position to the second position causes angular movement of the first and second pivot arms and tilting movement of the cradle from the generally horizontal first position toward the generally vertical lower loading/unloading position wherein at least a portion of the cradle extends lower than the base member to thereby facilitate access to the container in the second position, with the second end of the second pivot arm being lower than the first end of the second pivot arm when the cradle is in the second position.

2. A mounting assembly according to claim 1, wherein the second end of the first pivot arm is connected at least proximal to a forward end of the cradle.

3. A mounting assembly according to claim 2, wherein the first end of the second pivot arm is connected at least proximal to a rear end of the base member and the second pivot arm is shorter than the first pivot arm such that the cradle is rotated to the generally vertical orientation in the second position.

4. A mounting assembly according to claim 3, and further comprising a handle connected to the second pivot arm to facilitate movement of the cradle and accompanying container between the first and second positions.

5. A mounting assembly according to claim 3, and further comprising a pivot assembly pivotally connected to the base member, the pivot assembly being adapted for connection to the support structure so that the base member can pivot about a vertical axis with respect to the support structure.

6. A mounting assembly according to claim 1, wherein each pivot arm comprises a plate and a pair of bars extending from opposite sides of the plate.

7. A mounting assembly according to claim 6, wherein each bar on one side of the plates is pivotally connected to one side of the base member and the cradle, and each bar on the opposite side of the plates is pivotally connected to an opposite side of the base member and cradle to thereby form a double four-bar linkage with the base member and cradle.

8. A mounting assembly according to claim 6, wherein the base member comprises a plate and a pair of bars extending from opposite sides of the base member plate.

9. A mounting assembly according to claim 8, wherein the cradle comprises a floor, and further wherein the floor, the plate of each pivot arm and the plate of the base member are juxtaposed when the cradle is in the first position.

10. A mounting assembly according to claim 1, wherein each pivot arm comprises a pair of spaced bars, with one bar from each pivot arm being pivotally connected to one side of the base member and the cradle, and the other bar from each pivot arm being pivotally connected to an opposite side of the base member and cradle to thereby form a double four-bar linkage with the base member and cradle.

11. A mounting assembly according to claim 1, and further comprising a pivot assembly pivotally connected to the base member, the pivot assembly being adapted for connection to the support structure so that the base member can pivot about a vertical axis with respect to the support structure.

12. A mounting assembly according to claim 1, and further comprising at least one mounting bracket connected to the cradle for holding the container on the cradle.

13. A mounting assembly according to claim 1, and further comprising a handle connected to at least one of the pivot arms to facilitate movement of the cradle and accompanying container between the first and second positions.

14. A mounting assembly according to claim 1, wherein at least one of the pivot arms is pivotally and slidably mounted to at least one of the base member and the cradle.

15. A mounting assembly for holding and moving a propane cylinder between a first operational position and a second lower loading/unloading position with respect to a support structure of a forklift, the mounting assembly comprising:
   a base member adapted for connection to the forklift support structure;
   a cradle for supporting the cylinder between the first and second positions, the cradle being in a generally horizontal orientation in the first position and a generally vertical orientation in the second position with at least a portion of the cradle extending lower than the base member in the second position; and
   first and second pivot arms, each pivot arm having a first end pivotally connected to the base member and a second end pivotally connected to the cradle;
   wherein movement of the cradle between the first and second positions causes angular movement of the first and second pivot arms to thereby cause rotation tilting movement of the cradle between the generally horizontal and generally vertical orientations.

16. A mounting assembly according to claim 15, wherein the second pivot arm is shorter than the first pivot arm.

17. A mounting assembly according to claim 16, and further comprising a handle connected to the second pivot arm to facilitate movement of the cradle and accompanying cylinder between the first and second positions.

18. A mounting assembly according to claim 15, wherein each pivot arm comprises a pair of spaced bars, with one bar from each pivot arm being pivotally connected to one side of the base member and the cradle, and the other bar from each pivot arm being pivotally connected to an opposite side of the base member and cradle to thereby form a double four-bar linkage with the base member and cradle.

19. A mounting assembly according to claim 15, and further comprising a pivot assembly pivotally connected to the base member, the pivot assembly being adapted for connection to the support structure so that the base member can pivot about a vertical axis with respect to the support structure.

20. A mounting assembly according to claim 15, and further comprising at least one mounting bracket connected to the cradle for holding the cylinder on the cradle.

* * * * *